US010070578B2

(12) United States Patent
Kuriyagawa et al.

(10) Patent No.: US 10,070,578 B2
(45) Date of Patent: Sep. 11, 2018

(54) LAWN MOWER

(71) Applicant: Honda Motor Co., Ltd., Tokyo (JP)

(72) Inventors: Koji Kuriyagawa, Wako (JP); Hajime Yoshimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 18 days.

(21) Appl. No.: 15/442,971

(22) Filed: Feb. 27, 2017

(65) Prior Publication Data

US 2017/0245426 A1    Aug. 31, 2017

(30) Foreign Application Priority Data

Feb. 29, 2016  (JP) .................................. 2016-037050

(51) Int. Cl.
*A01D 34/68* (2006.01)
*A01D 34/73* (2006.01)
(Continued)

(52) U.S. Cl.
CPC ........... *A01D 34/006* (2013.01); *A01D 34/63* (2013.01); *A01D 34/6806* (2013.01);
(Continued)

(58) Field of Classification Search
CPC ........ A01D 34/00; A01D 34/68; A01D 34/73; A01D 34/76; A01D 34/001; A01D 34/008; A01D 34/63; A01D 34/82; A01D 34/006; A01D 34/005; A01D 34/6806; A01D 43/0631; A01D 2101/00; A01D 34/6812
(Continued)

(56) References Cited

U.S. PATENT DOCUMENTS 3,389,541 A * 6/1968 Freedlander ........... A01D 34/73
 56/295
3,724,182 A * 4/1973 Long ...................... A01D 42/00
 37/243
(Continued)

FOREIGN PATENT DOCUMENTS

| JP | 2002-315416 A | 10/2002 |
| JP | 2002-315418 A | 10/2002 |
| JP | 3771529 B2 | 4/2006 |

OTHER PUBLICATIONS

Related co-pending U.S. Appl. No. 15/443,478.
(Continued)

*Primary Examiner* — John G Weiss
(74) *Attorney, Agent, or Firm* — Westerman, Hattori, Daniels & Adrian, LLP

(57) ABSTRACT

A lawn mower includes a drive source for driving a cutter blade, flaps, a grass clippings container, a grass clippings container weight detection unit, a travel distance detection unit, and a control unit. The control unit determines a change amount of weight of the grass clippings container detected by the grass clippings container weight detection unit over the elapsed time period from the time when detection of travel distance of the lawn mower is started by the travel distance detection unit to the time when travel of predetermined distance is completed, and implements control in a manner that the rotation speed of the drive source and the flap angle of the flaps are adjusted in accordance with the change amount of the weight.

1 Claim, 16 Drawing Sheets

(51) Int. Cl.
*A01D 43/063* (2006.01)
*A01D 34/00* (2006.01)
*A01D 34/76* (2006.01)
*A01D 34/63* (2006.01)
*A01D 101/00* (2006.01)

(52) U.S. Cl.
CPC ............ *A01D 34/73* (2013.01); *A01D 34/76* (2013.01); *A01D 43/0631* (2013.01); *A01D 2101/00* (2013.01)

(58) Field of Classification Search
USPC ................. 56/10.2 R, 10.4, 196, 289, 295
See application file for complete search history.

(56) References Cited

U.S. PATENT DOCUMENTS

| | | | | |
|---|---|---|---|---|
| 5,040,364 | A * | 8/1991 | Deegan | A01D 43/0631 56/320.2 |
| 5,377,774 | A * | 1/1995 | Lohr | B62D 51/004 180/19.1 |
| 5,950,408 | A * | 9/1999 | Schaedler | A01D 34/64 56/10.2 R |
| 2002/0152736 | A1 | 10/2002 | Hasei et al. | |
| 2002/0153179 | A1 | 10/2002 | Kobayashi et al. | |
| 2003/0182916 | A1 | 10/2003 | Iida et al. | |
| 2004/0187463 | A1* | 9/2004 | Eddy | A01D 34/73 56/295 |
| 2005/0066643 | A1* | 3/2005 | Fukushima | A01D 34/006 56/16.7 |
| 2012/0000173 | A1* | 1/2012 | Papke | A01D 34/82 56/14.7 |

OTHER PUBLICATIONS

Related co-pending U.S. Appl. No. 15/442,899.
Related co-pending U.S. Appl. No. 15/443,213.
Related co-pending U.S. Appl. No. 15/443,257.
Related co-pending U.S. Appl. No. 15/443,144.

* cited by examiner

LAWN MOWER

CROSS-REFERENCE TO RELATED APPLICATION

This application is based upon and claims the benefit of priority from Japanese Patent Application No. 2016-037050 filed on Feb. 29, 2016, the contents of which are incorporated herein by reference.

BACKGROUND OF THE INVENTION

Field of the Invention

The present invention relates to a technique of a rotary lawn mower for cutting lawn grass by a cutter blade accommodated in a housing.

Description of the Related Art

The rotary lawn mower cuts (clips) lawn grass by rotating a cutter blade accommodated in a housing having an opened bottom, along lawn grass to cut the lawn grass. As a technique of such a lawn mower, for example, Japanese Laid-Open Patent Publication No. 2002-315418 is known.

The lawn mower known in Japanese Laid-Open Patent Publication No. 2002-315418 includes a housing having an opened bottom, a rotation shaft positioned inside the housing and extending in a vertical direction of the housing, and a narrow and long cutter blade accommodated in the housing in a manner that the cutter blade is rotatable about the rotation shaft. This cutter blade has blades and air lifts at both ends in a longitudinal direction. The blades are formed at front edges in a rotation direction of the cutter blade, and the air lifts are formed at rear edges in the rotation direction. When the cutter blades are rotated, the air lifts generate an upward air flow and a swirl air flow. By orienting the lawn grass growing on the lawn ground to stand upright by the upward air flow, it is possible to cut (clip) the lawn grass by the cutter blade efficiently. The lawn grass (grass clippings) cut by the cutter blade is lifted upward, and swirled in the housing by the upward air flow and the swirl air flow generated by the air lifts, and then, transported into a grass clippings container.

SUMMARY OF THE INVENTION

The characteristics of lawn grass (lawn condition) cut by the lawn mower often depend on the regional climate. For example, lawn grass containing a large amount of water content is heavy, and lawn grass containing a small amount of water content is light. That is, there are different conditions of lawn grass.

Further, even in the case of lawn grass growing on the same area, the lawn grass may have different lawn conditions. The load on the cutter blade is different depending on the lawn condition. As a result, the load on the engine is subject to change. The opening angle of a throttle valve for the engine is subject to change as well. For example, during the lawn mowing operation by the cutter blade, the load on the engine may be increased due to the rapid change of the lawn condition. In order to maintain the desired finishing quality of the lawn mowing operation, it is preferable to eliminate unevenness in the lawn grass due to the difference in the lawn condition. To this end, the human operator is required to detect the change in the lawn condition consciously, and this is laborious. There is a room of further improvement in the work efficiency of the lawn mowing operation.

An object of the present invention is to provide a technique which makes it possible to improve the work efficiency of lawn mowing operation by a lawn mower.

In the present invention, a lawn mower includes a cutter blade rotatable about a rotation shaft extending in a vertical direction, a drive source configured to drive the cutter blade through the rotation shaft, and a grass clippings container configured to store lawn grass cut by the cutter blade and transported by transportation wind generated by the cutter blade.

Further, the lawn mower includes a flap provided for the cutter blade in a manner that the flap has a flap angle changeable along a horizontal line which is perpendicular (or substantially perpendicular) to the rotation shaft, an actuator configured to control the flap angle of the flap, a control unit configured to control the actuator, a grass clippings container weight detection unit configured to detect weight of the grass clippings container, and a travel distance detection unit configured to detect travel distance of the lawn mower.

The control unit is configured to implement control in a manner that rotation speed of the drive source and the flap angle of the flap are kept substantially constant over an elapsed time period from time when detection of the travel distance is started by the travel distance detection unit to time when travel of predetermined distance is completed, determine a change amount of the weight of the grass clippings container detected by the grass clippings container weight detection unit over the elapsed time period, and implement control in a manner that the rotation speed of the drive source and the flap angle of the flap are adjusted in accordance with the change amount of the weight.

Therefore, the control unit determines the change amount of the weight of the grass clippings container over the elapsed time period during which the lawn mower travels by the predetermined distance. If the change amount of the weight is large, it is possible to presume that the lawn grass (grass clippings) cut by the cutter blade has a lawn condition of heavy weight. If the change amount of the weight is small, it is possible to presume that the lawn grass (grass clippings) cut by the cutter blade has a lawn condition of light weight. In this manner, it is possible to adjust the rotation speed of the drive source and the flap angle of the flap depending on the characteristics (lawn condition) of the lawn grass cut by the cutter blade.

Therefore, regardless of the lawn condition, by orienting the lawn grass growing on the lawn ground to stand upright by the upward air flow, it is possible to cut the lawn grass by the cutter blade efficiently. Further, after the lawn grass (grass clippings) cut by the cutter blade is lifted upward and swirled in the housing by the upward air flow and the swirl air flow generated by the flaps, the lawn grass can be transported into the lawn grass clippings container efficiently. Therefore, regardless of the lawn condition, the operator can perform the lawn mowing operation stably and highly efficiently. It is possible to eliminate unevenness in the clipping of the grass due to the difference in the lawn condition, without requiring the operator to perform some operation consciously. Consequently, it is possible to improve the work efficiency of the lawn mowing operation.

Further, by adjusting the rotation speed of the drive source and the flap angle of the flap depending on the characteristics of the lawn grass (lawn condition) cut by the cutter blade, the wind amount of the transportation wind generated by the cutter blade and the flap changes. Therefore, it is possible to store the grass clippings in the grass clippings container as uniformly as possible. Accordingly, it is possible to greatly improve the storage ratio of the grass clippings container. It is possible to store the larger quantity of grass clippings in the grass clippings container efficiently.

In the present invention, it is possible to improve the work efficiency of the lawn mowing operation by the lawn mower.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An embodiment for carrying out the present invention will be described with reference to the accompanying drawings.

A lawn mower according to the embodiment will be described with reference to the drawings. It should be noted that, in the following description, the words "front", "rear", "left", "right", "upper", and "lower" are used to refer to directions as viewed from a human operator. "Fr" denotes the front side, "Rr" denotes the rear side", "Le" denotes the left side, "Ri" denotes the right side, and the "CL denotes" the center of the machine width (central line of the machine width).

Figure 1:
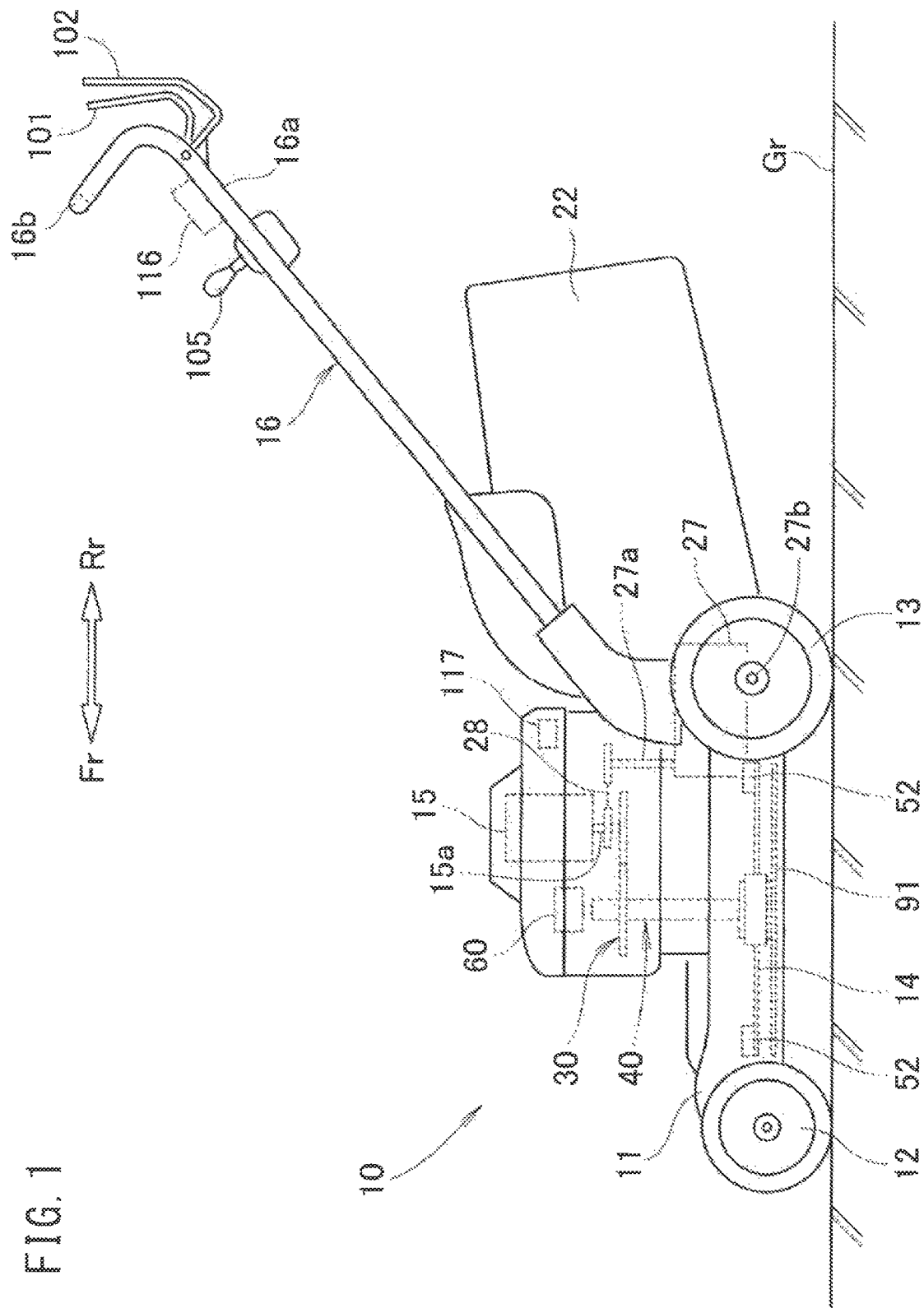
FIG. 1 is a left side view of a lawn mower of the present invention.
Figure 2:
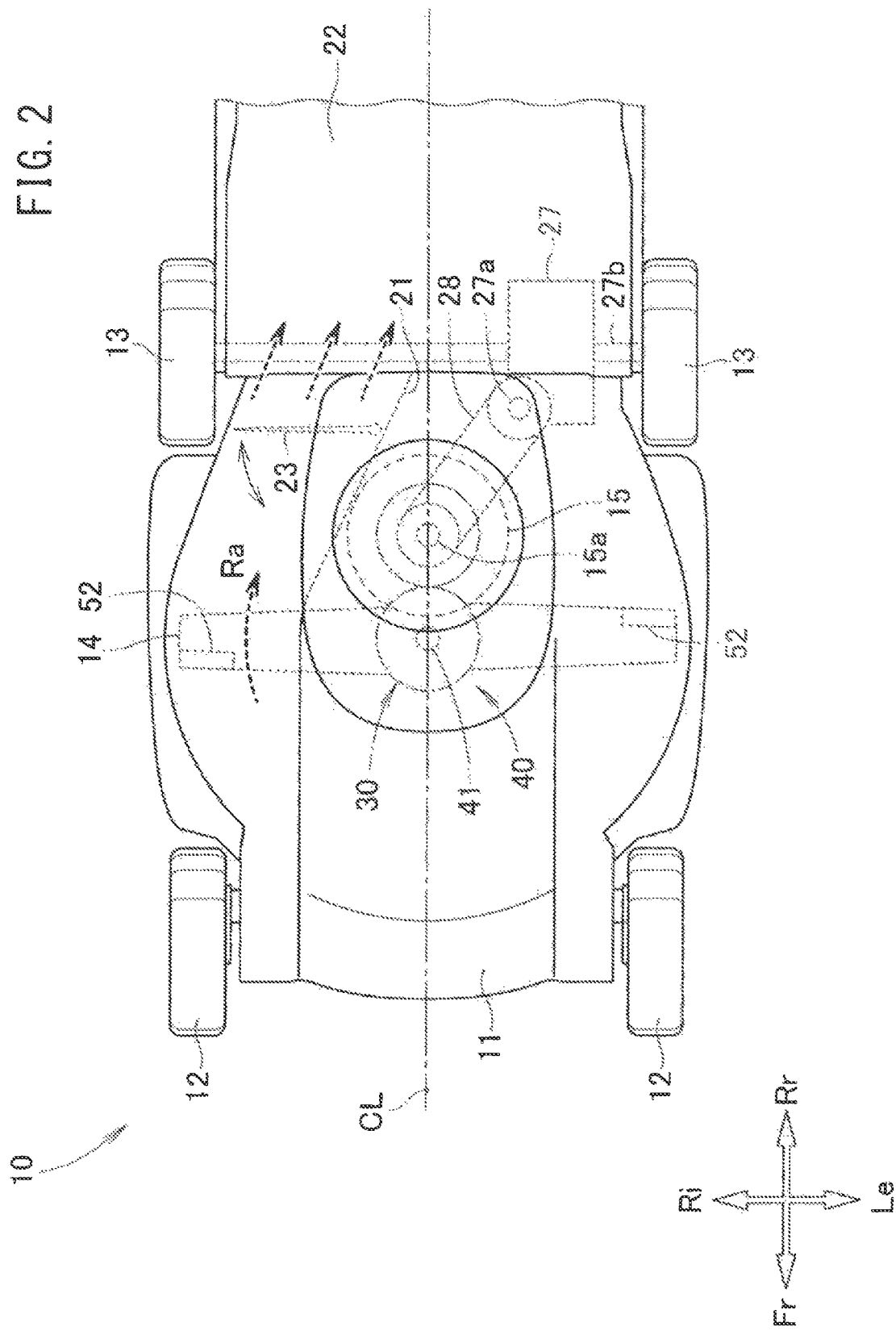
FIG. 2 is a plan view of the lawn mower shown in FIG. 1.

As shown in FIGS. 1 and 2, a lawn mower 10 is a walk-behind, self-propelled working machine for cutting lawn grass. The lawn mower 10 includes a housing 11, left and right wheels 12 provided on the front side of the housing 11, left and right wheels 13 provided on the back side of the housing 11, a cutter blade 14 accommodated inside the center of the housing 11 for cutting lawn grass, a drive source 15 (engine 15) provided above the housing 11, and an operation handle 16 extending backward from the housing 11. In the following description, a case where the drive source 15 is an engine is taken as an example. It should be noted that the drive source 15 is not limited to the engine. For example, the drive source 15 may be an electric motor.

As shown in FIG. 2, in a plan view, this lawn mower 10 rotates the cutter blade 14 clockwise by the engine 15 to cut (clip) the lawn grass, and generates flows of the air (swirl air flow or swirl wind) in the housing 11 as indicated by an arrow Ra. By the swirl air flow, the lawn grass cut by the cutter blade 14 can be delivered to, and stored in a grass clippings container 22 through a grass clippings discharge passage 21. For example, the grass clippings container 22 is a bag. Hereinafter, the lawn grass cut (clipped) by the cutter blade 14 will be referred to as the "grass clippings".

As shown in FIG. 1, this housing 11 is a so-called opened bottom housing where only the lower end surface (surface facing the lawn ground Gr) of the housing 11 is opened entirely. This housing 11 is a member having a spiral shape in a plan view, i.e., a spiral case (scroll case). The housing 11 has a scroll section for swirling the lawn grass cut by the cutter blade 14 by the swirl wind, and transporting the lawn grass (grass clippings) toward the grass clippings discharge passage 21. Structure of this housing 11 is well known (see Japanese Patent No. 3771529).

As shown in FIG. 2, a mode switch damper 23 is provided for the grass clippings discharge passage 21. This mode switch damper 23 can be operated by a damper operation lever 24 (see FIG. 8). This damper operation lever 24 is a mode switching unit for switching the mode switch damper 23. Hereinafter, this damper operation lever 24 will also be referred to as the "mode switching unit 24" as necessary. By operating the damper operation lever 24, it is possible to switch the operating mode as necessary, between (1) a bagging mode for opening the mode switch damper 23 to store the grass clippings in the grass clippings container 22 and (2) a mulching mode for closing the mode switch damper 23 to discharge the grass clippings to a position below the housing 11.

Figure 3:
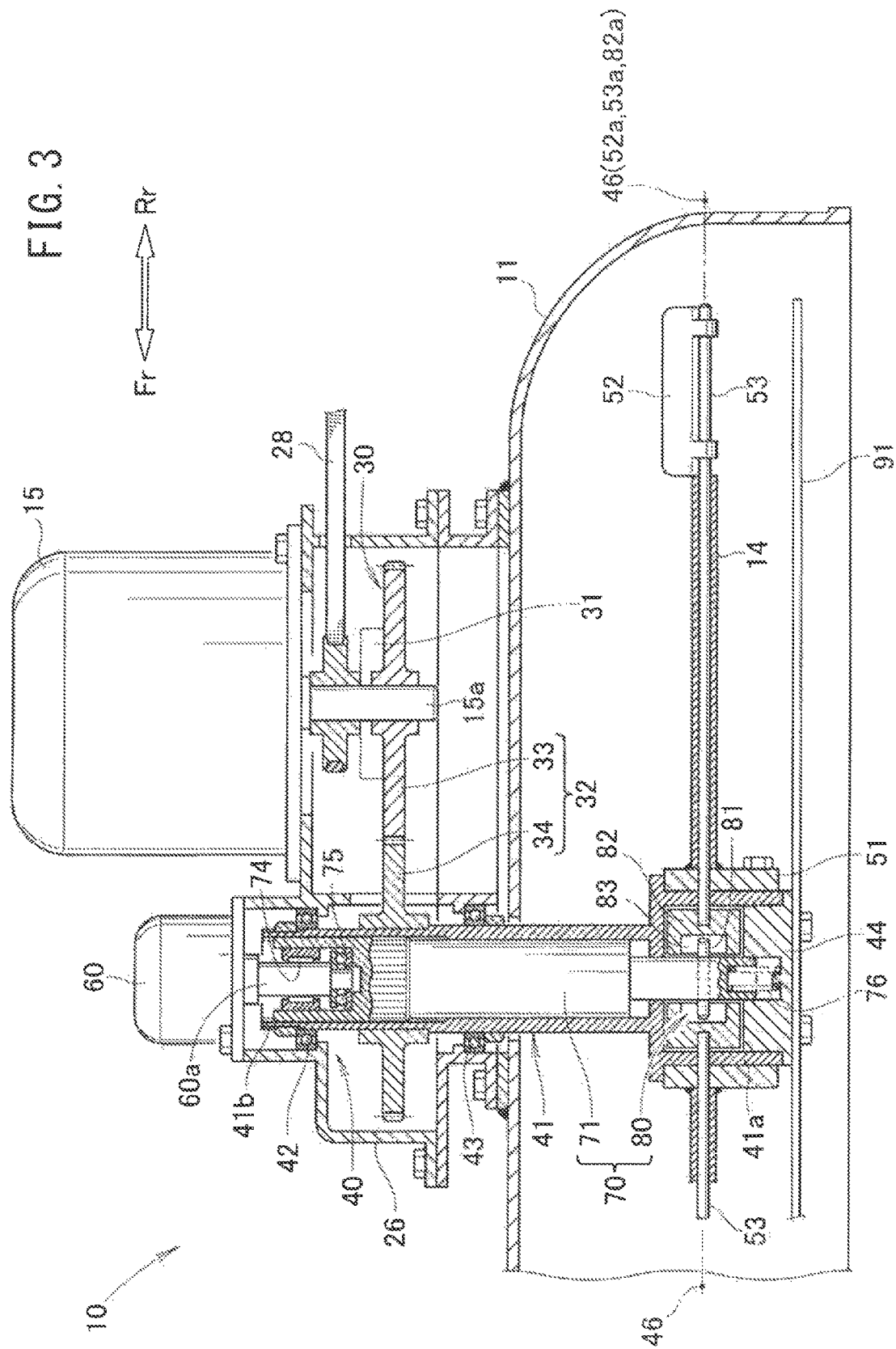
FIG. 3 is a cross sectional view showing a drive source, a cutter mechanism, and an area around a cutter blade shown in FIG. 1.

As shown in FIG. 3, this housing 11 also serves as a machine body, and includes a stand 26 at an upper position. The engine 15 is mounted on an upper end surface of this stand 26. The engine 15 has an output shaft 15a extending from its lower end toward the lawn ground Gr (ground Gr) into the housing 11. The output shaft 15a is a rotation shaft positioned above the housing 11, and extends in a vertical direction (in an up-down direction) of the housing 11. Consequently, the output shaft (rotation shaft) 15a is substantially perpendicular to the horizontal lawn ground Gr.

As shown in FIGS. 1 and 3, the left and right rear wheels 13 are travel drive wheels. That is, the power generated by the engine 15 is transmitted to the left and right rear wheels 13 through a transmission 27 (hydraulic continuously variable transmission 27). An input shaft 27a of the hydraulic continuously variable transmission 27 is coupled to the output shaft 15a of the engine 15 by a belt 28. This hydraulic continuously variable transmission 27 can switch (reverse) the rotation direction of an output shaft 27b (wheel shaft 27b) outputted to the rear wheels 13, in response to the rotation direction of the input shaft 27a driven by the engine 15, and switch (change the transmission) of the rotation speed of the output shaft 27b continuously, in response to the rotation speed of the input shaft 27a. The structure of this hydraulic continuously variable transmission 27 is well known (e.g., see Japanese Laid-Open Patent Publication No. 2002-315416).

As shown in FIG. 3, the power generated by the engine 15 is transmitted to a cutter mechanism 40 by a working power transmission system 30. A clutch 31 and a power transmission mechanism 32 are provided in the working power transmission system 30 from the engine 15 to a rotation shaft 41 of the cutter mechanism 40. The power transmission mechanism 32 is made up of a drive gear 33 and a driven gear 34. The drive gear 33 is attached to the output shaft 15a of the engine 15 through the clutch 31. The driven gear 34 is attached to an upper end 41b of the rotation shaft 41. These gears 33, 34 are spur gears. When the clutch 31 is in the OFF state, the rotation shaft 41 is released from the output shaft 15a of the engine 15. When the clutch 31 is in the ON state, the rotation shaft 41 is coupled to the output shaft 15a of the engine 15. Hereinafter, this cutter mechanism 40 and the cutter blade 14 will be described in detail.

Figure 4:
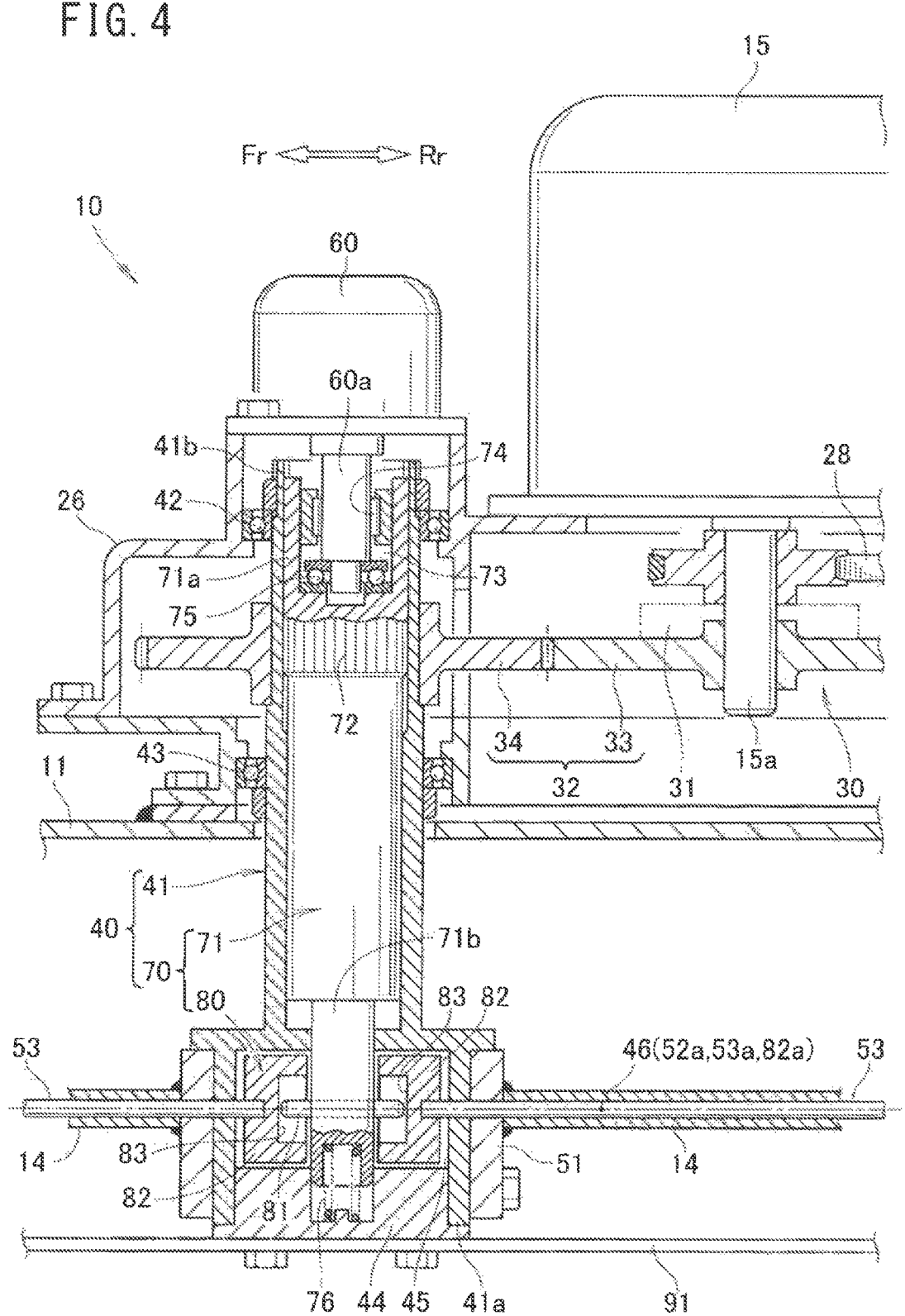
FIG. 4 is a cross sectional view in which the cutter mechanism and the area around the cutter blade shown in FIG. 3 are enlarged.

As shown in FIG. 4, the cutter mechanism 40 includes the rotation shaft 41 and a transmission mechanism 70. This transmission mechanism 70 will be described later. The rotation shaft 41 extends in a vertical direction of the housing 11. The rotation shaft 41 is positioned in parallel to the output shaft 15a of the engine 15. This rotation shaft 41 is supported by bearings 42, 43 in a manner that the rotation shaft 41 is rotatable but restricted axially with respect to the stand 26. Consequently, the rotation shaft 41 is supported in a manner that the rotation shaft 41 is rotatable with respect to the housing 11, and movement of the rotation shaft 41 in the axial direction is restricted.

The rotation shaft 41 is a hollow shaft. Hereinafter, this rotation shaft 41 will also be referred to as the "hollow shaft 41" as necessary. A lower end 41a of the rotation shaft 41 is positioned within the housing 11. The diameter of this lower end 41a of the rotation shaft 41 is larger than the other portion of the rotation shaft 41. The lower end 41a is opened downward to have a substantially cup shape. The opened end surface in the lower end 41a is closed by a cap 44. The cap 44 is detachably attached to the lower end 41a of the rotation shaft 41 by a fixing member such as a bolt. The inside of the lower end 41a and the cap 44 form a space 45.

Figure 5:
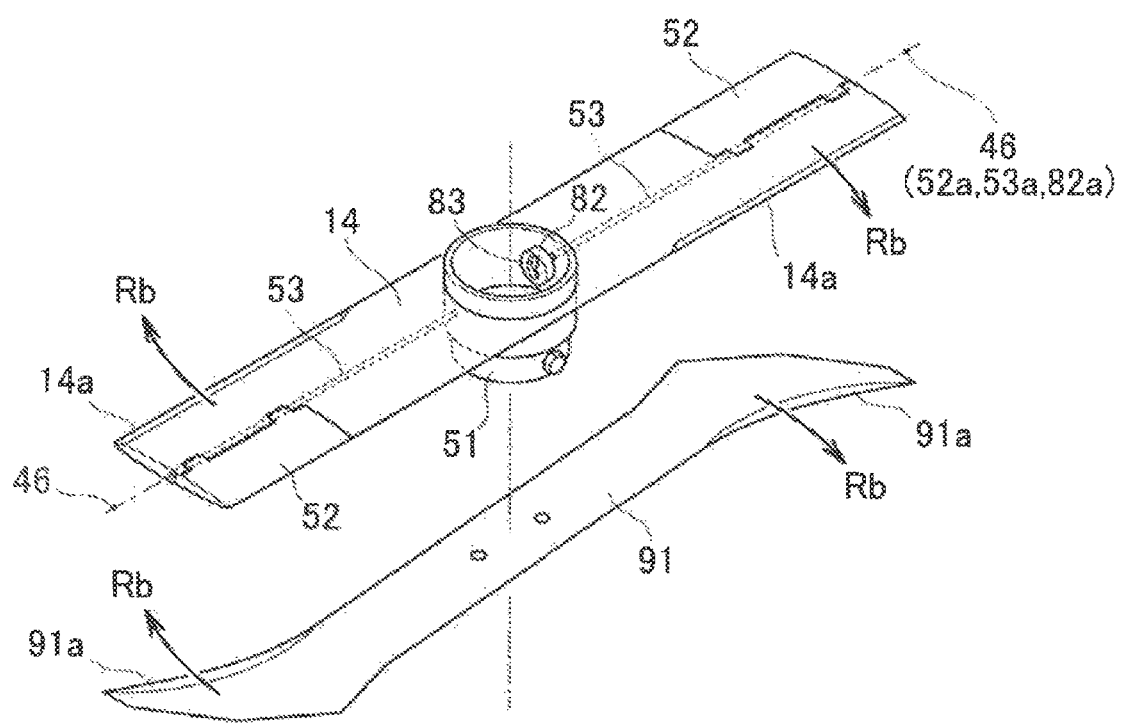
FIG. 5 is an exploded perspective view showing the cutter blade and a lower cutter blade shown in FIG. 3.

As shown in FIGS. 4 and 5, the cutter blade 14 is provided for the rotation shaft 41, and placed in the housing 11. This cutter blade 14 is a long narrow member having a substantially flat plate shape in a plan view, extending in a horizontal line 46 perpendicular to (or substantially perpendicular to) the rotation shaft 41. Both ends of the cutter blade 14 in the longitudinal direction have a pair of blades 14a, at front edges of the cutter blade 14 in the rotation direction.

Further, an annular hub 51 is provided at the center of the cutter blade 14 in the longitudinal direction. The hub 51 is an annular member fitted to an outer circumferential surface of the lower end 41a of the rotation shaft 41. The hub 51 is detachably attached to the lower end 41a by a fixing member such as a bolt. Therefore, the cutter blade 14 is rotatable together with the rotation shaft 41.

Figure 6:
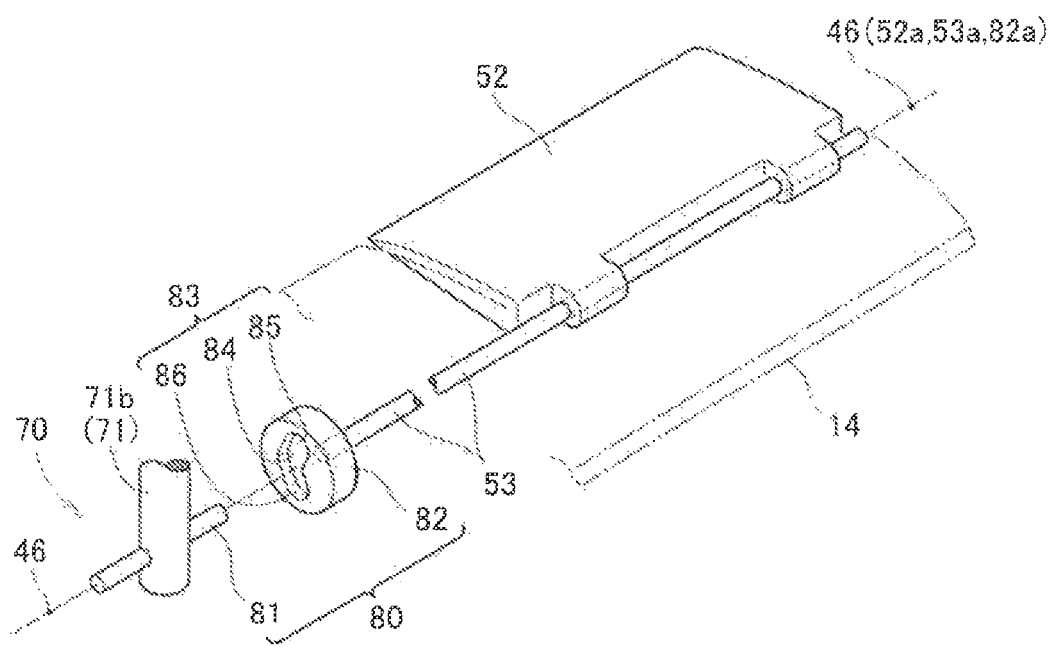
FIG. 6 is an exploded view showing a cutter blade, a flap, and an area around a conversion mechanism shown in FIG. 5.

As shown in FIGS. 3, 5, and 6, flaps 52 are formed at least at part of the cutter blade 14. The range of the flaps 52 in the cutter blade 14 may be any of, only part of the cutter blade 14, the half of the front end of the cutter blade 14, and the entire cutter blade 14.

For example, the flaps 52 are provided at both ends of the cutter blade 14 in the longitudinal direction. The flaps 52 are provided opposite to the pair of blades 14a with respect to the cutter blade 14. The cutter blade 14 is cut out for the space required for providing the flaps 52.

The flap angle (upper and lower swing angles) of the flaps 52 can be changed along the horizontal line 46. More specifically, two flap support shafts 53 (as a pair) are provided on the horizontal line 46. The flap support shafts 53 are provided concentrically with each other. One end of each of the pair of flap support shafts 53 extends through the hub 51, into the space 45 (see FIG. 4) of the lower end 41a of the rotation shaft 41. Further, the one end of each of the pair of the flap support shafts 53 is rotatably supported by the hub 51. The movement of the flap support shaft 53 in the axial direction is restricted.

The pair of flaps 52 is attached to the pair of the flap support shafts 53. In the structure, the flaps 52 can swing in accordance with rotation of the flap support shafts 53 vertically (direction of the upper and lower surfaces of the flaps 52) about the flap support shafts 53. That is, the flaps 52 are auxiliary blades that can swing up and down along the horizontal line 46 (in the longitudinal direction of the cutter blade 14). Hereinafter, the flaps 52 will also be referred to as the "auxiliary blades 52" as necessary.

As shown in FIGS. 3 and 4, the flap angle of the flaps 52 is controlled by an output from an actuator 60. That is, the output of the actuator 60 is transmitted to the flaps 52 by the transmission mechanism 70. This transmission mechanism 70 is accommodated inside the hollow shaft 41 (rotation shaft 41). The transmission mechanism 70 is made up of a control shaft 71 and a conversion mechanism 80.

The control shaft 71 is slidable in the axial direction with respect to the hollow shaft 41, and relative rotation of the control shaft 71 with respect to the hollow shaft 41 is restricted, and the control shaft 71 is fitted into the hollow shaft 41. Specifically, the control shaft 71 is slidable along the hollow shaft 41 by a spline 72, and relative rotation of the control shaft 71 is restricted. It should be noted that the control shaft 71 may adopt structure using serration or parallel keys instead of the spline 72.

The actuator 60 is a linear actuator. That is, an output shaft 60a of the actuator 60 is slidable in the axial direction of the control shaft 71. The output shaft 60a and the control shaft 71 are positioned concentrically with respect to the hollow shaft 41.

The output shaft 60a of the actuator 60 is combined with an upper end 71a of the control shaft 71 in a manner that the control shaft 71 can be driven to move in a sliding manner. More specifically, a recess 73 having a circular shape in cross section is formed at an upper end of the control shaft 71. The recess 73 is opened upward. The output shaft 60a of the actuator 60 is fitted to the recess 73.

Two roller bearings 74, 75 are interposed between the output shaft 60a of the actuator 60 and the control shaft 71. One of the roller bearings 74, 75 is a radial bearing 74, and the other of the roller bearings 74, 75 is a thrust bearing 75. It should be noted that the two roller bearings 74, 75 may comprise needle bearings. The outer circumferential surface of the output shaft 60a is supported by the radial bearing 74 in a manner that the outer circumferential surface of the output shaft 60a is rotatable, and slidable on the inner circumferential surface of the recess 73. The lower end surface of the output shaft 60*a* rotatably contacts the bottom surface of the recess 73 through the thrust bearing 75. The output shaft 60*a* moves down to displace the control shaft 71 in a sliding manner through the thrust bearing 75.

A lower end 71*b* of the control shaft 71 extends into the space 45, and faces an upper surface of the cap 44. A compression coil spring 76 (return spring 76) is interposed between the lower end surface of the control shaft 71 and the upper surface of the cap 44. The compression coil spring 76 biases the control shaft 71 toward the lower end surface of the output shaft 60*a* of the actuator 60. In the structure, the lower end surface of the output shaft 60*a* contacts the bottom surface of the recess 73 through the thrust bearing 75 all the time. As the output shaft 60*a* moves upward, the compression coil spring 76 can displace the control shaft 71 upward in a sliding manner. Consequently, the control shaft 71 is synchronized with forward/backward movement of the output shaft 60*a* of the actuator 60, and can slide vertically in the same direction as the output shaft 60*a*.

The conversion mechanism 80 is capable of converting the slide movement of the control shaft 71 into movement to change the flap angle of the flaps 52, i.e., swing movement, and the conversion mechanism 80 is accommodated inside the hollow shaft 41 (i.e., the space 45). That is, the lower end 71*b* of the control shaft 71 is coupled to the flaps 52 through the conversion mechanism 80.

As shown in FIGS. 4 to 7D, this conversion mechanism 80 includes a pin 81 and a pair of cams 82. The pin 81 extends outside toward both sides in the radial direction from the lower end 71*b* of the control shaft 71. For example, the pin 81 passes through the lower end 71*b* in the radial direction.

The two cams 82 (as a pair) are circular disk members. Each of the cams 82 is connected to one end of each of the pair of flap support shafts 53. The pair of cams 82 is rotatable about the pair of the flap support shafts 53, and supported at the lower end 41*a* of the rotation shaft 41. As described above, the pair of cams 82 is rotatably supported by the hollow shaft 41 about a swing center 52*a* (horizontal line 46) of the flaps 52, and provided at the flaps 52 by the flap support shafts 53.

The cams 82 have cam surfaces 83 which can contact the pin 81. The cam surfaces 83 face each other. The front end of the pin 81 can contact the cam surfaces 83. These cam surfaces 83 are formed by cam grooves which are configured to convert the sliding movement of the pin 81 which is displaced vertically together with the control shaft 71 into the rotation movement of the cams 82. Hereinafter, the cam surfaces 83 will also be referred to as the "cam grooves 83" as necessary. The outer circumferential surface of the pin 81 slides along the side surfaces of the cam grooves 83, and can be displaced vertically. As a result, the cam 82 is rotated.

Figure 7A:
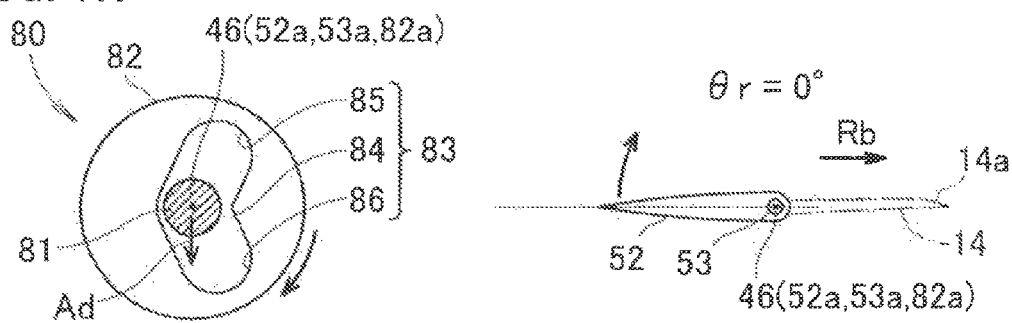
FIG. 7A is a view showing a first relationship between the flap and the conversion mechanism shown in FIG. 6.

As shown in FIGS. 6 and 7A, this cam groove 83 is formed around the swing center 52*a* of the flap 52, and has a V-shape oriented substantially in a lateral direction. In this regard, the swing center 52*a* of the flap 52 is in alignment with a center 53*a* of the flap support shaft 53 and a rotation center 82*a* of the cam 82. The swing center 52*a* of the flap 52 is positioned along the horizontal line 46 perpendicular to the rotation shaft 41. More specifically, the cam groove 83 includes a groove center 84 positioned on the rotation center 82*a* of the cam 82, an upper groove 85 extending upward obliquely from the groove center 84, and a lower groove 86 extending downward obliquely from the groove center 84. The groove center 84, the upper groove 85, and the lower groove 86 are continuous.

Next, operation relationship between the conversion mechanism 80 and the flaps 52 will be described with reference to FIGS. 7A to 7D. FIG. 7A shows the relationship between the conversion mechanism 80 and the flap 52 when the flap 52 is in the horizontal state (flap angle θr=0°). At this time, the pin 81 is positioned at the groove center 84 (the rotation center 82*a* of the cam 82). The cutter blade 14 is rotated in a direction indicated by an arrow Rb together with the flap 52 in the horizontal state. Thus, the cutter blade 14 can cut (clip) the lawn grass.

Figure 7B:
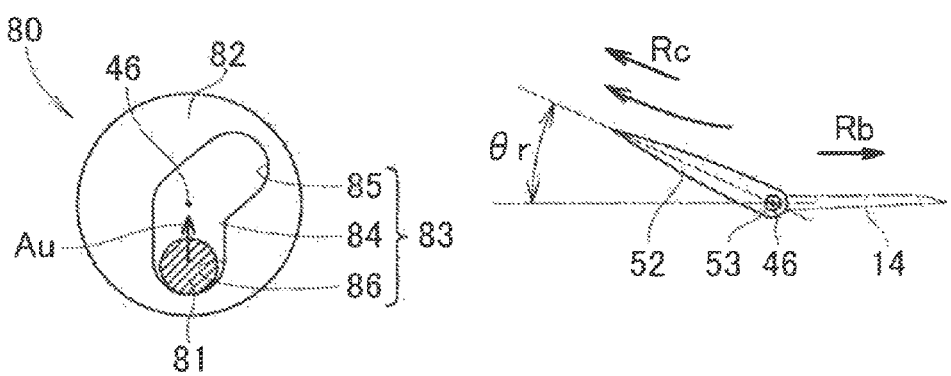
FIG. 7B is a view showing a second relationship between the flap and the conversion mechanism shown in FIG. 6.

Thereafter, the pin 81 is displaced downward (in a direction indicated by an arrow Ad) together with the control shaft 71 shown in FIG. 6, to push the side wall of the lower groove 86 of the cam groove 83 downward. Since the cam 82 and the flap support shaft 53 are rotated clockwise, the flap 52 swings upward. The result is shown in FIG. 7B. The degree of the swing angle θr at which the flap 52 swings from the horizontal state, i.e., the degree of the flap angle θr corresponds to the downward displacement amount of the control shaft 71. By rotation of the cutter blade 14, the flap 52 generates upward air flow Rc.

Thereafter, the pin 81 is displaced upward (in a direction indicated by an arrow Au) together with the control shaft 71 shown in FIG. 6. The pin 81 is in the so-called "missed swing" state where the pin 81 is only displaced upward in the lower groove 86 until the pin 81 returns to the groove center 84. Therefore, the flap angle θr of the flap 52 does not change.

Figure 7C:
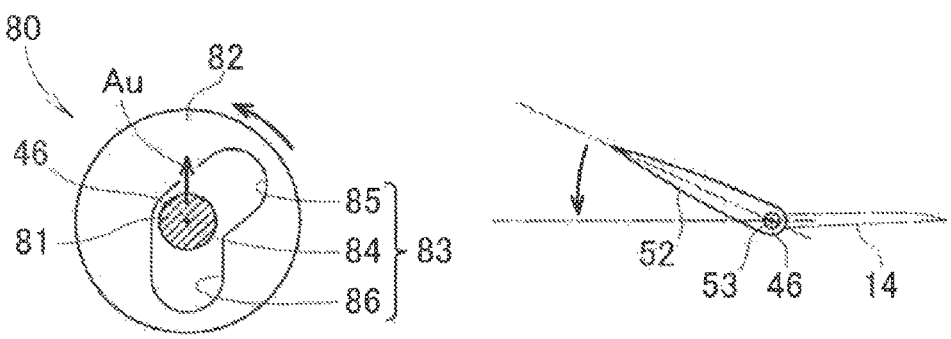
FIG. 7C is a view showing a third relationship between the flap and the conversion mechanism shown in FIG. 6.
Figure 7D:
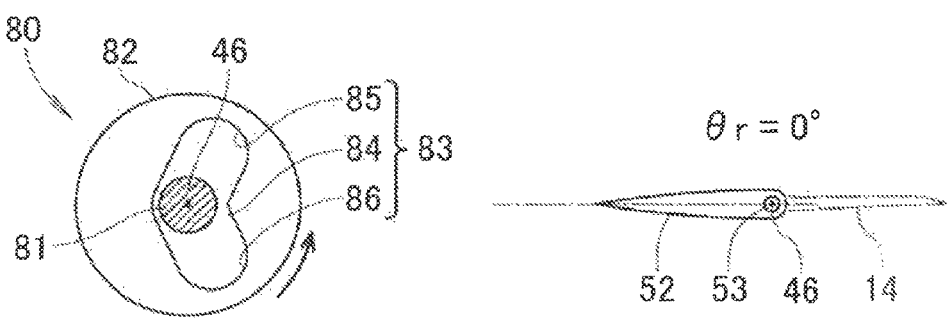
FIG. 7D is a view showing a fourth relationship between the flap and the conversion mechanism shown in FIG. 6.

Thereafter, as shown in FIG. 7C, the pin 81 is displaced further upward from the groove center 84 (in a direction indicated by an arrow Au) to push the side wall of the upper groove 85 upward. Since the cam 82 and the flap support shaft 53 are rotated counterclockwise in the drawing, the flap 52 swings downward. The result is shown in FIG. 7D. The flap 52 returns to the horizontal state (flap angle θr=0°).

The above explanation is summarized below. As shown in FIGS. 4, 5, 7A to 7D, the lawn mower 10 includes the flaps 52 (auxiliary blades 52) provided along the horizontal line 46, at least at part of the cutter blade 14 in a manner that the flap angle θr (swing angle θr) can be changed, the actuator 60 having (generating) an output to control the flap angle θr of the flaps 52, and the transmission mechanism 70 for transmitting the output of the actuator 60 to the flaps 52.

Therefore, the flap angle θr of the flaps 52 of the cutter blade 14 can be set to the optimum angle by the actuator 60 as necessary in accordance with the working condition of the lawn mower 10. Thus, swirl wind can be generated by the flaps 52 efficiently, in accordance with the working condition for lawn mowing operation. The grass clippings can be swirled by the swirl wind efficiently in the housing 11, and transported into the grass clippings container 22 (see FIG. 2) efficiently. Accordingly, it is possible to improve the energy consumption efficiency in the drive source (power source) 15 for driving the cutter blade 14. Further, it is not necessary to change the rotation speed of the cutter blade 14.

Further, it is possible to control the flap angle θr of the flaps 52 in accordance with the load state of the cutter blade 14 and/or the negative pressure state in the housing 11. By controlling the flap angle θr of the flaps 52, it is possible to sufficiently suppress the jamming phenomenon of the grass clippings which may occur in the transportation path of the grass clippings from the housing 11 to the grass clippings container 22.

Further, during the operation at low load where, e.g., the cutter blade 14 is rotated idly, and no grass clipping operation is performed, by decreasing the flap angle θr of the flaps 52, it is possible to reduce the noises such as wind noises.

Further, it is possible to improve the noise suppression performance regardless of the rotation speed of the cutter blade 14.

Further, when the grass clippings are blown by the swirl wind to store the grass clippings in the grass clippings container 22, by setting the flap angle θr of the flaps 52 as necessary, it is possible to adjust the distance by which the grass clippings fly over the swirl wind. Consequently, it is possible to efficiently store the grass clippings in the grass clippings container 22.

Further, as shown in FIG. 4, the transmission mechanism 70 is accommodated inside the hollow shaft 41. That is, the transmission mechanism 70 is provided by utilizing the rotation shaft 41 effectively. By accommodating the transmission mechanism 70 in the hollow rotation shaft 41, it is possible to efficiently provide the transmission mechanism 70 in a compact space in the housing 11 efficiently. Further, since the transmission mechanism 70 is not exposed into the housing 11, there is no concern of jamming between the transmission mechanism 70 and the housing 11. Further, the swirl wind generated by the cutter blade 14 or the flaps 52 can flow smoothly into the housing 11 without being obstructed by the transmission mechanism 70. Therefore, though the transmission mechanism 70 is present, it is possible to store the grass clippings efficiently in the grass clippings container 22 by allowing the grass clippings to fly over the swirl wind which flows smoothly.

Further, as shown in FIG. 4, the transmission mechanism 70 includes the control shaft 71 and the conversion mechanism 80. The lower end 71b of the control shaft 71 is coupled to the flaps 52 through the conversion mechanism 80. The output shaft 60a of the actuator 60 is combined with the upper end 71a of the control shaft 71 in a manner that the control shaft 71 can be driven to move in a sliding manner. Thus, the control shaft 71 is driven by the actuator 60 to move in a sliding manner, and the sliding movement of the control shaft 71 can be converted by the conversion mechanism 80 into movement to change the flap angle θr of the flaps 52. As a result, the flap angle θr can be controlled by the actuator 60. Further, the transmission mechanism 70 is made up of the control shaft 71 fitted into the hollow shaft 41 in a slidable manner in the axial direction, and the conversion mechanism 80 accommodated inside the hollow shaft 41. Therefore, the transmission mechanism 70 can be accommodated efficiently in the rotation shaft 41, by effectively utilizing the inner space of the hollow rotation shaft 41.

Further, as shown in FIG. 4, by the cam mechanism made up of the pin 81 and the cams 82, it is possible to form the simple and compact conversion mechanism 80. Further, the sliding movement of the control shaft 71 can be converted into movement of changing the flap angle θr of the flaps 52 promptly.

Further, as shown in FIGS. 4 and 6, the cam groove 83 is formed in a V-shape substantially oriented laterally, around the swing center 52a of the flaps 52. In the structure, by changing the slide direction of driving the control shaft 71 by the actuator 60, it is possible to change the swing direction of the flaps 52. For example, the swing direction of the flaps 52 can be changed from upward to downward. In this case, by reversing rotation of the rotation shaft 41, it is possible to generate an upward air flow by the flaps 52. As described above, the swing direction of the flaps 52 and the rotation direction of the rotation shaft 41 can be combined as necessary, in accordance with the usage condition of the lawn mower 10.

Further, as shown in FIG. 4, the roller bearings 74, 75 are interposed between the output shaft 60a of the linear actuator 60 and the control shaft 71. In the structure, when the control shaft 71 and the hollow shaft 41 are rotated together, the frictional resistance between the output shaft 60a of the linear actuator 60 and the control shaft 71 can be reduced as much as possible. Therefore, even if the control shaft 71 is rotated at high speed, it is possible to promptly and reliably drive the control shaft 71 to move in a sliding manner by the linear actuator 60. Even during rotation of the cutter blade 14, it is possible to set the flap angle θr of the flaps 52 promptly and reliably to the optimum angle in accordance with the working condition of the lawn mower 10.

In this regard, when the cutter blade 14 having the flaps 52 shown in FIGS. 1 and 3 is rotated, it is possible to generate the upward air flow by the flaps 52. The magnitude of this upward air flow depends on the degree of the flap angle θr of the flaps 52. Negative pressure is generated below the cutter blade 14 by the upward air flow. In correspondence with the magnitude of this negative pressure, the degree in which the lawn grass growing on the lawn ground Gr (ground Gr) stands upright changes. For ensuring that the lawn grass after lawn mowing operation has a constant height as much as possible, it is more preferable to adjust the height of the housing 11 having the cutter blade 14 finely.

In this regard, as shown in FIGS. 4 and 5, a lower cutter blade 91 is positioned below the cutter blade 14. This lower cutter blade 91 comprises a fixed blade fixed to the rotation shaft 41 (hollow shaft 41). That is, the lower cutter blade 91 is removably attached to the cap 44 by a fixing member such as a bolt. In the structure, the lower cutter blade 91 is rotatable together with the rotation shaft 41. This lower cutter blade 91 is a narrow and long member having a substantially flat plate shape in a plan view, and basically extends along the cutter blade 14. This lower cutter blade 91 may be positioned in slightly out of phase with the cutter blade 14. Two blades 91a (as a pair) are provided at both ends of the lower cutter blade 91 in the longitudinal direction. The blades 91a are formed on the front edges of the lower cutter blade 91 in the rotation direction Rb.

Therefore, the magnitude of the negative pressure generated below the lower cutter blade 91 by the upward air flow is substantially constant. The degree in which the lawn grass growing on the lawn ground Gr (ground Gr) stands upright is substantially constant. It is possible to keep the height of lawn grass after lawn mowing operation as constant as possible.

Therefore, it is possible to efficiently generate the swirl wind by the flaps 52 of the upper cutter blade 14, and ensure that the lawn grass has the constant height after lawn mowing operation by the lower cutter blade 91 as much as possible.

Figure 8:
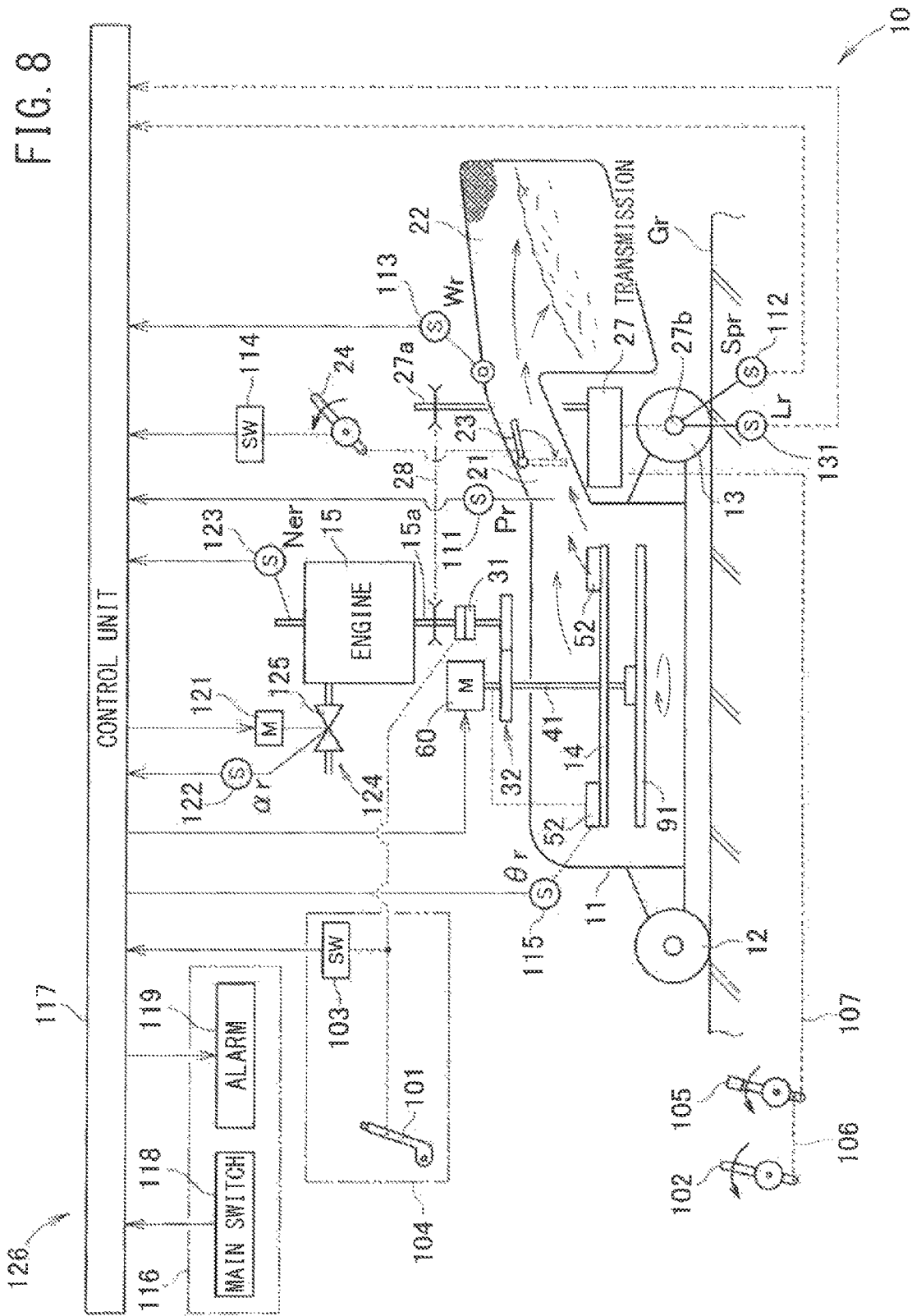
FIG. 8 is a schematic diagram of the lawn mower shown in FIG. 1.

As shown in FIGS. 1 and 8, the operation handle 16 has a substantially arch shape as viewed from the back side of the lawn mower 10, and includes left and right handle bars 16a extending backward, and upward from the housing 11, and a grip 16b bridging the left and right handle bars 16a. A clutch lever 101 and a travel lever 102 are attached to a rear end of the left and right handle bars 16a in a manner that the clutch lever 101 and the travel lever 102 can swing back and forth. The clutch lever 101 and the travel lever 102 have a substantially arch shape along the back side of the operation handle 16, as viewed from the back side of the lawn mower 10. The clutch lever 101 and the travel lever 102 can be gripped together with the grip 16b by a hand when swung to the front side. The clutch lever 101 and the travel lever 102 are automatic return type operation members, such that when these levers 101, 102 are released from the hand, the levers 101, 102 return to their original positions automatically.

The clutch lever 101 is an operation member for switching the clutch 31. Only in the state where the clutch lever 101 and the grip 16b are gripped together by the hand, the clutch 31 is placed in the ON state. As a result, the cutter blade 14 can be placed in the operating state. When the clutch lever 101 is released from the hand, the clutch 31 automatically returns to the OFF state. As a result, the cutter blade 14 can be placed in the stop state.

The operation position of the clutch lever 101 is detected by a clutch operation detection sensor 103. For example, the clutch operation detection sensor 103 may comprise a switch. When the clutch 31 is switched on by the clutch lever 101, i.e., when the cutter blade 14 is switched to the operating state, the clutch operation detection sensor 103 detects an operation switch position, and outputs an operation switch signal. When the clutch 31 is turned off by the operation clutch lever 101, i.e., when the cutter blade 14 is switched to the stop state, the clutch operation detection sensor 103 detects an operation stop switch position to output a stop switch signal. The combination structure of the clutch lever 101 and the clutch operation detection sensor 103 constitutes a blade switching unit 104.

As long as the blade switching unit 104 can perform switching of the cutter blade 14 between the operating state and the stop state, the blade switching unit 104 may have any structure. For example, the blade switching unit 104 only includes an operation switch. By the operation switch, it is possible to electrically switch the state of the clutch 31 between ON and OFF. In this case, when the operation switch switches the clutch 31 to the ON state, i.e., switches the cutter blade 14 to the operating state, the operation switch outputs an operation switch signal. In this case, when the operation switch switches the clutch 31 to the OFF state, i.e., switches the cutter blade 14 to the stop state, the operation switch outputs a stop switch signal.

Hereinafter, the blade switching unit 104 (including the operation switch) will also be referred to as the "blade switch 104" as necessary.

A shift lever 105 is provided on the back side of the left or right handle bar 16a. The shift lever 105 performs transmission operation of the transmission 27. The shift lever 105 is connected to the travel lever 102 through a tension spring 106, and coupled to a transmission arm of the transmission 27 through a transmission cable 107. When the travel lever 102 is operated, the transmission 27 rotates the rear wheels 13 at the speed in correspondence with the transmission operation position of the shift lever 105. Thereafter, the travel lever 102 is returned to its original position, and the output rotation of the transmission 27 becomes zero, and the rear wheels 13 are stopped.

The lawn mower 10 includes an internal pressure detection unit 111, a travel speed detection unit 112, a grass clippings container weight detection unit 113, a mode switch 114, a flap angle detection unit 115, an operation unit 116, and a control unit 117. The operation unit 116 and the control unit 117 are positioned adjacent to the engine 15 (drive source 15) or at the operation handle 16. The operation unit 116 includes a main switch 118 and an alarm 119.

The internal pressure detection unit 111 detects the internal pressure Pr of the housing 11, and outputs a detection signal. For example, the internal pressure detection unit 111 is positioned between the housing 11 and the mode switch damper 23, in the grass clippings discharge passage 21.

The travel speed detection unit 112 detects the travel speed Spr (vehicle velocity Spr) of the lawn mower 10, and outputs a detection signal. For example, the travel speed detection unit 112 detects the rotation speed of the wheel shaft 27b of the rear wheels 13 to indirectly detect the vehicle velocity Spr of the lawn mower 10.

The grass clippings container weight detection unit 113 detects the weight Wr of the grass clippings container 22, and outputs a detection signal. For example, the grass clippings container weight detection unit 113 detects the weight Wr of the grass clippings container 22 directly or indirectly. The grass clippings container 22 is detachably attached to the outlet of the grass clippings discharge passage 21. The weight Wr of the grass clippings container 22 is applied to this outlet. Further, moment of this weight Wr is applied to the outlet. In accordance with the magnitude of this moment, the grass clippings container 22 attempts to swing (rotate) downward relative to the outlet. By detecting this swing angle (rotation angle), the grass clippings container weight detection unit 113 can detect the weight Wr of the grass clippings container 22 indirectly. Further, by detecting the weight Wr applied to the outlet, the grass clippings container weight detection unit 113 can detect the weight Wr of the grass clippings container 22 indirectly. Moreover, the grass clippings container weight detection unit 113 may be configured to directly detect the weight Wr of the grass clippings container 22.

The mode switch 114 detects a switch position of the mode switch damper 23, and outputs a detection signal. That is, the mode switch 114 is a mode switch detection unit for outputting a switch signal corresponding to opening/closing of the mode switch damper 23. Hereinafter, the mode switch 114 will also be referred to as the "mode switch detection unit 114" as necessary. This mode switch 114 directly detects an opening/closing position of the mode switch damper 23 or detects a lever position of the damper operation lever 24 to indirectly detect the opening/closing position of the mode switch damper 23. Then, after the mode switch 114 detects that the mode switch damper 23 is at an open position, the mode switch 114 outputs an open signal, i.e., a bagging mode signal. Further, after the mode switch 114 detects that the mode switch damper 23 is at a closed position, the mode switch 114 outputs a close signal, i.e., a mulching mode signal.

The mode switching unit 24 is not limited to the damper operation lever. Power means such as an electric motor may be used as the mode switching unit 24. In such a case, the mode switching unit 24 comprising the power means can be switched by the mode switch 114. The mode switch 114 in this case plays a role of the "mode switch detection unit" for outputting a switch signal in correspondence with opening/closing of the mode switch damper 23, and additionally, plays a role of the "operation switch" for switching the mode switching unit 24 comprising the power means.

In this case, when the mode switch damper 23 is operated by the mode switch detection unit 114 (mode switch 114) comprising the operation switch, for switching to the open position, the mode switch detection unit 114 outputs the bagging mode signal. Further, when the mode switch damper 23 is operated by the mode switch detection unit 114, for switching to the closed position, the mode switch detection unit 114 outputs the mulching mode signal.

The flap angle detection unit 115 detects the flap angle θr of the flaps 52, and outputs a detection signal. For example, the flap angle detection unit 115 detects the axial position of the output shaft 60a of the actuator 60, the axial position of the control shaft 71, and the rotation angle of the flap support shaft 53 shown in FIG. 3 to indirectly detect the flap angle θr of the flaps 52.

The main switch 118 comprises a rotary switch for turning on/off the power supply system of the lawn mower 10. For example, in the case where the drive source 15 comprises an engine, the main switch 118 comprises an ignition switch. The ignition switch 118 (main switch 118) is capable of switching among an OFF position, an ON position, and a start position.

By operating the ignition switch 118 for switching from the OFF position to the ON position, the power supply system of the lawn mower 10 is turned on to prepare for starting operation of the engine 15.

By operating the ignition switch 118 for switching from the ON position to the start position (ST position), it is possible to start operation of the engine 15. After operation of the engine 15 is started, the ignition switch 118 is returned from the start position to the ON position.

By returning the ignition switch 118 from the ON position to the OFF position, it is possible to stop operation of the engine 15, and stop the power supply system of the lawn mower 10.

As described above, the main switch 118 is operated for switching between the start and stop of operating the engine 15 (drive source 15). Hereinafter, the main switch 118 (ignition switch 118) will also be referred to as the "drive source operation switch 118" as necessary.

The alarm 119 issues notifications visually or by outputting sounds in accordance with instructions from the control unit 117.

Next, the system of the engine 15 will be described. The engine 15 includes a throttle valve control motor 121, a throttle opening angle detection unit 122, and an engine speed detection unit 123. The throttle valve control motor 121 is an actuator for opening/closing a throttle valve 125 of an engine intake system 124. For example, the throttle valve control motor 121 is a step motor. The throttle opening angle detection unit 122 detects the opening angle αr of the throttle valve 125, and outputs a detection signal.

The engine speed detection unit 123 detects the rotation speed Ner (rotation number Ner) of the engine 15, and outputs a detection signal. When the engine 15 (drive source 15) in the rotating state is stopped, the value of the rotation speed Ner becomes substantially "zero". When the engine speed detection unit 123 detects that the value of the rotation speed Ner becomes substantially "zero", i.e., detects that the engine 15 (drive source 15) in the rotating state has been stopped, the engine speed detection unit 123 outputs a drive source stop signal. Hereinafter, the engine speed detection unit 123 will also be referred to as the "drive source stop detection unit 123" as necessary.

The control unit 117 is an electronic control unit for controlling the engine 15 in a predetermined control mode by receiving signals from the main switch 118 or various detection units. For example, the control unit 117 is a microcomputer. That is, based on various items of data such as the detected rotation speed Ner of the engine 15 and the opening angle αr of the throttle valve 125, by controlling the opening angle αr of the throttle valve 125 through the throttle valve control motor 121 in a predetermined control mode, electrical control is implemented in a manner that the rotation speed Ner of the engine 15 matches the target rotation speed. Further, the control unit 117 electrically controls the flap angle θr of the flaps 52 by receiving signals from the main switch 118 and/or various detection units.

As can be seen from the above explanation, the engine 15 is characterized by mounting an electronic governor 126 (also referred to as the electric governor, or electric speed governor). The electronic governor 126 controls the rotation speed Ner of the engine 15 based on the control signal from the control unit 117 by automatically adjusting the opening angle αr of the throttle valve 125 by the throttle valve control motor 121. The electronic governor 126 is made up of combination of the control unit 117, the throttle valve control motor 121, the throttle opening angle detection unit 122, the engine speed detection unit 123, and the throttle valve 125.

Next, the control flow in the case where the control unit 117 (see FIG. 8) comprises a microcomputer will be described with reference to FIGS. 9 to 15. In the control flow chart shown in FIGS. 9 to 15, among the steps for controlling the lawn mower 10, only the steps regarding control of the rotation speed Ner of the drive source 15 and the flap angle θr of the flaps 52 will be described, and explanation about the steps regarding other items of control is omitted. Further, in this control flow, explanation about a case where the drive source 15 is an engine, and the main switch 118 is an ignition switch will be given as an example. Hereinafter, the explanation will be given with reference to FIGS. 3, 4, and 8.

Figure 9:
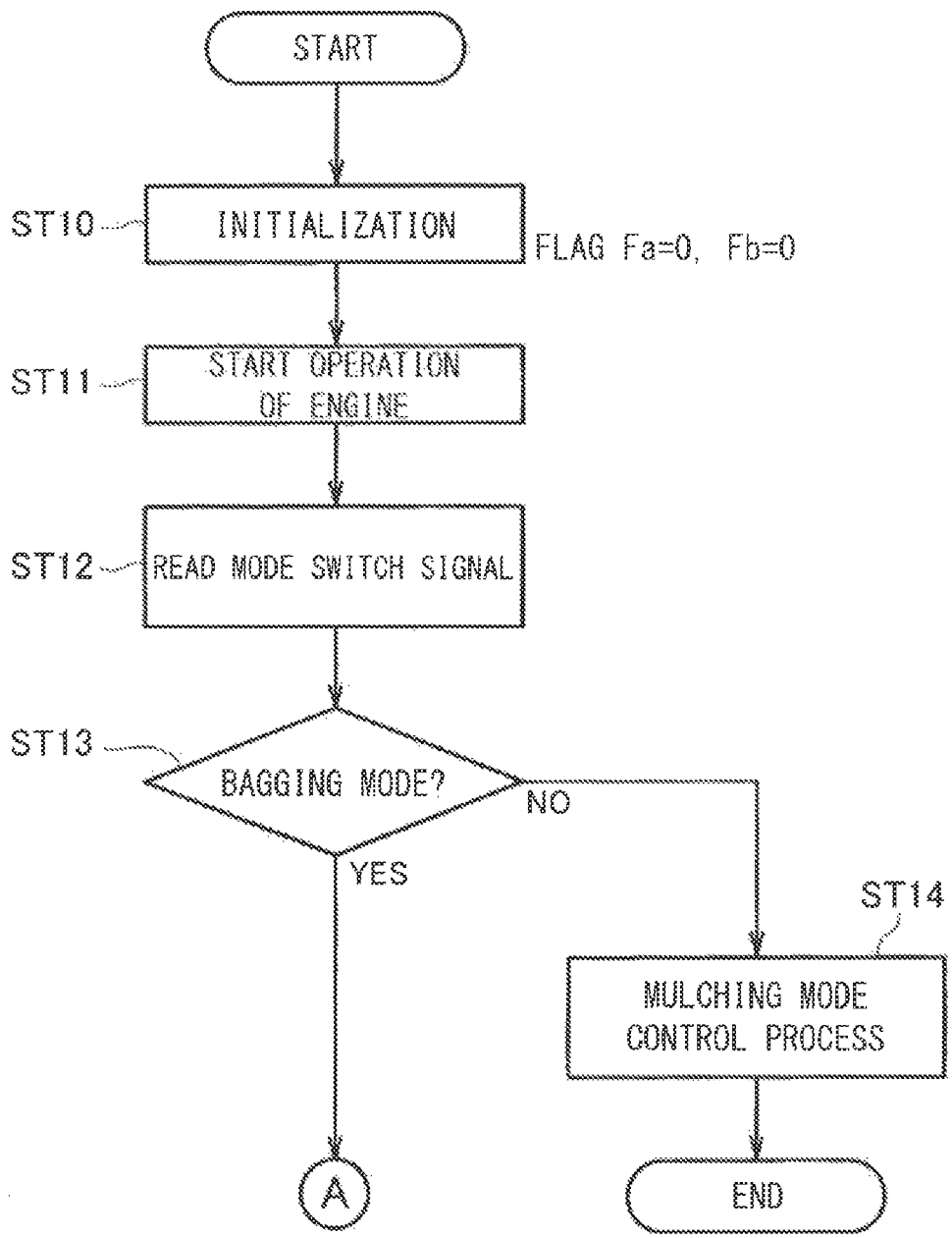
FIG. 9 shows the former part of a control flow chart of the control unit shown in FIG. 8.
Figure 10:
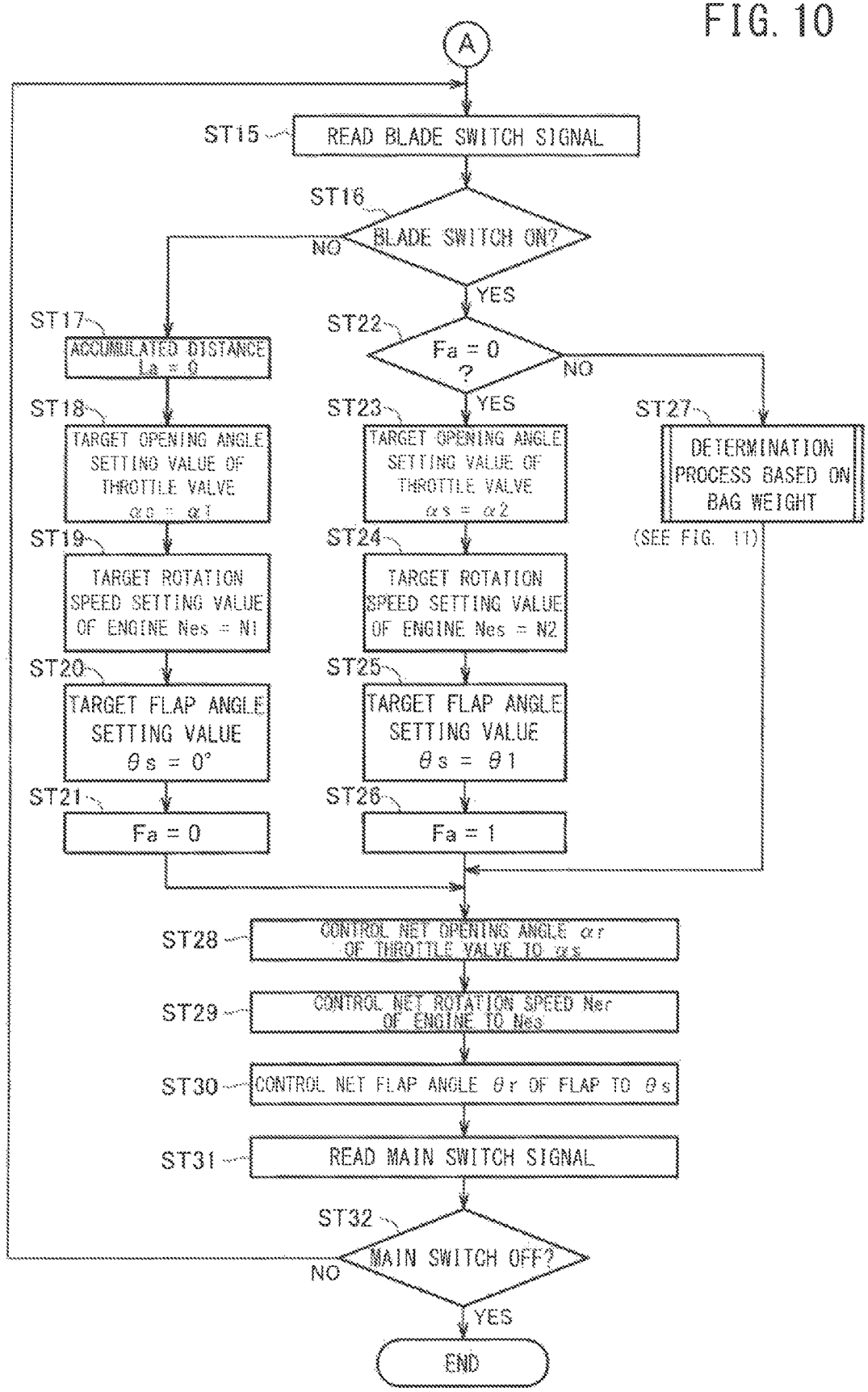
FIG. 10 shows the latter part of the control flow chart of the control unit shown in FIG. 8.

FIGS. 9 and 10 show a control flow chart of the control unit 117 according to the present invention. When control is started, firstly, in step ST10, the control unit 117 performs initialization for setting each of setting values and flags to an initial value. For example, a blade switch flag Fa is set to "0", and an initial value flag Fb is set to "0".

Next, operation of the engine 15 is started (step ST11). Operation of the engine 15 is started when the main switch 118 is operated for switching from an ON position to a start position. Then, a signal of the mode switch 114 is read (step ST12).

Next, it is determined whether the lawn mower 10 is operated in the bagging mode or the mulching mode (step ST13). If a signal indicating that the mode switch damper 23 is opened is received from the mode switch 114, it is determined that the lawn mower 10 is operated in the bagging mode. If a signal indicating that the mode switch damper 23 is closed is received from the mode switch 114, it is determined that the lawn mower 10 is operated in the mulching mode.

At this time, if it is determined that the lawn mower 10 is operated in the mulching mode, the control proceeds to step ST14. In step ST14, after the mulching mode control process is performed, the control flow including the series of operations is finished. In the mulching mode, the grass clippings cut by the cutter blade 14 can be discharged to a position below the housing 11.

In step ST13, if it determined that lawn mower 10 is operated in the bagging mode, the control proceeds to step ST15. In step ST15, a signal of the blade switch 104 is read.

Next, it is determined whether or not the blade switch 104 is on (step ST16). At this time, if it is determined that the blade switch 104 is off, the control proceeds to step ST17.

In this step ST17, the value of the accumulated distance La is reset to 0 (La=0). This accumulated distance La will be described later. In the next step ST18, the setting value of the target opening angle αs (reference opening angle αs) of the throttle valve 125 is set to a predetermined first reference opening angle α1 (αs=α1). In the next step ST19, the target rotation speed setting value Nes of the engine 15 is set to a predetermined first reference rotation speed N1 (Nes=N1). In the next step ST20, the target flap angle setting value θs of the flaps 52 is set to 0° (θs=0°). In the next step ST21, after the blade switch flag Fa is set to "0", the control proceeds to step ST28. In this manner, when the blade switch 104 is off, in steps ST17 to ST21, initial values of the elements when operation of the cutter blade 14 is stopped are set.

In the meanwhile, in step ST16, if it is determined that the blade switch 104 is on, the control proceeds to step ST22. In step ST22, it is determined whether or not the blade switch flag Fa is "0" (Fa=0). If it is determined that the flag Fa=0, the control proceeds to step ST23.

In step ST23, the setting value of the target opening angle αs (reference opening angle αs) of the throttle valve 125 is set to a predetermined second reference opening angle α2 (αs=α2). The second reference opening angle α2 is larger than the first reference opening angle α1 in step ST18 by a predetermined opening angle (α2>α1).

In the next step ST24, the target rotation speed setting value Nes of the engine 15 is set to a predetermined second reference rotation speed N2 (Nes=N2). The second reference rotation speed N2 is higher than the first reference rotation speed N1 in the above step ST19 by a predetermined speed (N2>N1).

In the next step ST25, the target flap angle setting value θs of the flaps 52 is set to a predetermined first reference flap angle θ1 (θs=θ1). The first reference flap angle θ1 is larger than 0°. In the next step ST26, after the blade switch flag Fa is set to "1", the control proceeds to step ST28.

In this manner, when the blade switch 104 is on, if the blade switch flag Fa is "0", in steps ST23 to ST26, basic values of the elements during rotation of the cutter blade 14 are set.

In the above step ST22, if it is determined that the blade switch flag Fa is not "0" (Fa≠0), the control proceeds to step ST27. In step ST27, after the determination process based on the change amount of the weight of the grass clippings container 22 (bag 22), the control proceeds to step ST28. Specific control flow for performing the determination process based on the weight change amount in this step ST27 will be described with reference to FIG. 11.

In the next step ST28, the throttle valve control motor 121 is controlled until the actual opening angle αr (net opening angle αr) of the throttle valve 125, which is detected by the throttle opening angle detection unit 122, becomes equal to the target opening angle αs, i.e., αr=αs.

In the next step ST29, the actual rotation speed Ner (net rotation speed Ner) of the engine 15 detected by the engine speed detection unit 123 is controlled until it becomes equal to the target rotation speed setting value Nes (target rotation speed Nes), i.e., Ner=Nes.

In the next step ST30, the actuator 60 is controlled until the actual flap angle θr (net flap angle θr) of the flaps 52 detected by the flap angle detection unit 115 becomes equal to the target flap angle θs (target flap angle setting value θs), i.e., θr=θs.

Next, a switch signal of the main switch 118 is read (step ST31). Next, it is determined whether or not the main switch 118 has been operated for switching to an OFF position (step ST32). As long as it is determined that the main switch 118 has not been operated for switching to the OFF position, the control returns to step ST15 to repeat these steps ST15 to ST32. In the meanwhile, in step ST32, if it is determined that the main switch 118 has been operated for switching to the OFF position, this control flow is finished.

Figure 11:
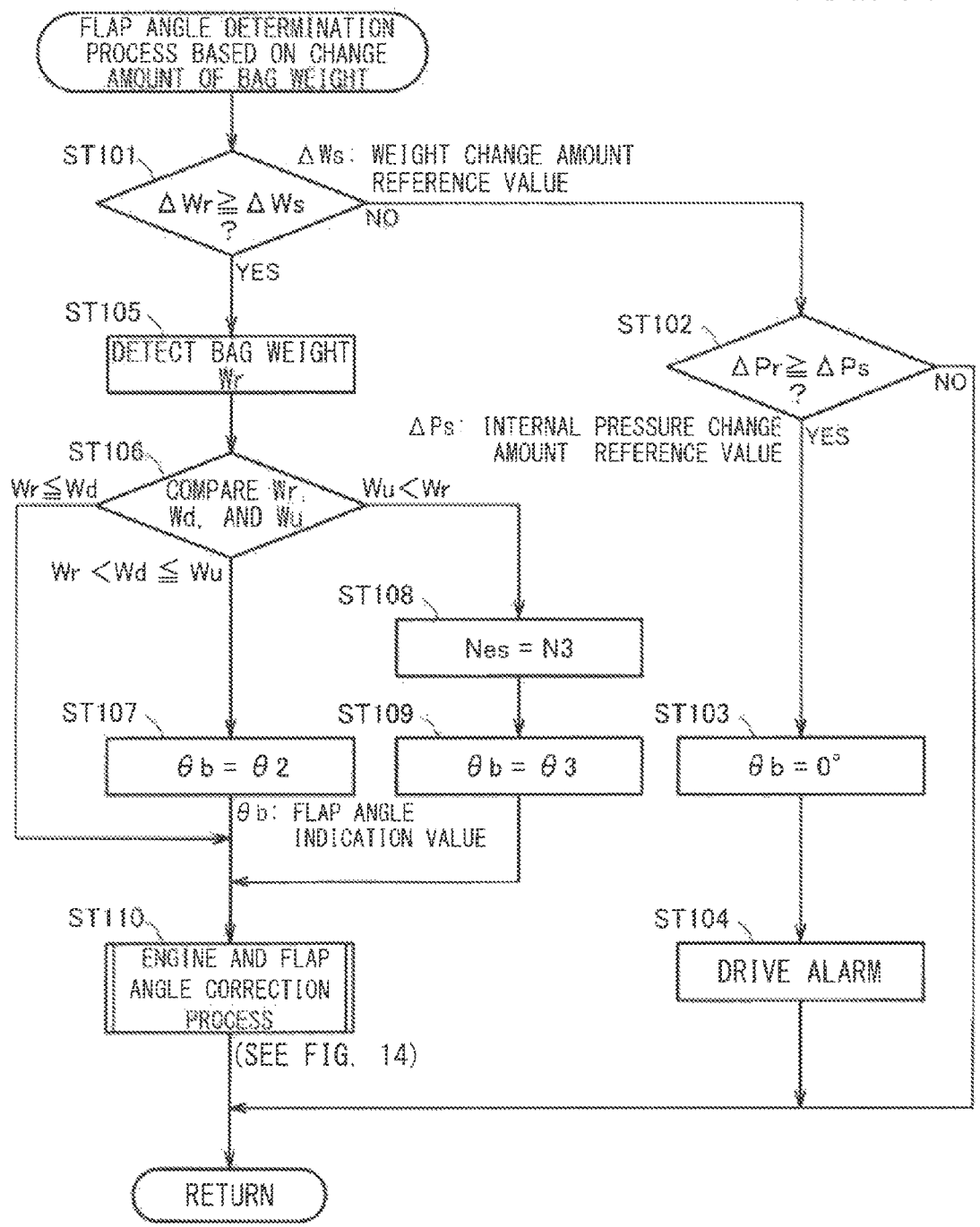
FIG. 11 shows a sub-routine of step ST27 of the control flow chart shown in FIG. 10.

FIG. 11 is a sub-routine for carrying out the determination process based on the change amount in the weight of the grass clippings container 22 (bag 22) shown in the above step ST27 of FIG. 10.

Firstly, in step ST101, it is determined whether or not the change amount $\Delta Wr$ per predetermined fixed time $\Delta t1$, of the weight Wr detected by the grass clippings container weight detection unit 113 has been increased to a predetermined weight change amount reference value $\Delta Ws$ ($\Delta Wr \geq \Delta Ws$). This change amount $\Delta Wr$ is determined successively every predetermined fixed minute time by an interruption routine (bag weight change amount determination process), e.g., shown in FIG. 12. This interruption routine will be described later.

In step ST101, if it is determined that the change amount $\Delta Wr$ is below the weight change amount reference value $\Delta Ws$ ($\Delta Wr < \Delta Ws$), i.e., if it is determined that the change amount $\Delta Wr$ has not been increased to the predetermined weight change amount reference value $\Delta Ws$, the control proceeds to the next step ST102. In this step ST102, it is determined whether or not the change amount $\Delta Pr$ per predetermined fixed time $\Delta t2$ of the internal pressure Pr detected by the internal pressure detection unit 111 has been increased to a predetermined internal pressure change amount reference value $\Delta Ps$ ($\Delta Pr \geq \Delta Ps$). For example, the fixed time $\Delta t2$ is the same as the fixed time $\Delta t1$. This change amount $\Delta Pr$ is determined successively every predetermined fixed minute time by an interruption routine (housing internal pressure change amount determination process), e.g., shown in FIG. 13. This interruption routine will be described later.

In this step ST102, if it is determined that the change amount $\Delta Pr$ per certain fixed time $\Delta t2$ of the internal pressure Pr has been increased to the internal pressure change amount reference value $\Delta Ps$ ($\Delta Pr \geq \Delta Ps$), in step ST103, the target flap angle indication value θb of the flaps 52 is set to 0° (θb=0°), and then, the control proceeds to step ST104. In step ST104, control is implemented to drive the alarm 119, and then, the control returns to step ST27 of FIG. 10. In the meanwhile, in step ST102, if it is determined that the change amount $\Delta Pr$ has not been increased to the internal pressure change amount reference value $\Delta Ps$ ($\Delta Pr < \Delta Ps$), control directly returns to step ST27 of FIG. 10.

In this regard, a condition where "the change amount $\Delta Wr$ of the weight Wr per fixed time $\Delta t1$ is below the weight change amount reference value $\Delta Ws$ ($\Delta Wr < \Delta Ws$)" determined in step ST101 will be referred to as the "first condition". Further, a condition where "the change amount $\Delta Pr$ per predetermined fixed time $\Delta t2$ of the internal pressure Pr has been increased to the internal pressure change amount reference value $\Delta Ps$ ($\Delta Pr \geq \Delta Ps$)" determined in step ST102 will be referred to as the "second condition". If it is determined that the two conditions (the first condition and the second conditions) are satisfied, the control unit 117 controls the actuator 60 in a manner that the flaps 52 are placed in a substantially horizontal state (see ST103 and ST30 in FIG. 10), and drives the alarm 119 (see step ST104).

In step ST101, if it is determined that the change amount $\Delta Wr$ has been increased to the weight change amount reference value $\Delta Ws$ ($\Delta Wr \geq \Delta Ws$), the control proceeds to step ST105.

In this step ST105, the actual weight Wr (net weight Wr) of the grass clippings container 22 is detected by the grass clippings container weight detection unit 113. Next, the value of the net weight Wr is compared with the first weight reference value Wd and the second weight reference value Wu (step ST106). The first weight reference value Wd is smaller than the second weight reference value Wu.

In step ST106, if it is determined that the net weight Wr is equal to or smaller than the first weight reference value Wd (Wr≤Wd), the control proceeds to step ST110 directly.

In step ST106, if it is determined that the net weight Wr exceeds the first weight reference value Wd and equal to or less than the second weight reference value Wu (Wr<Wd≤Wu), the control proceeds to step ST107. In step ST107, the target flap angle indication value θb of the flaps 52 is set to a predetermined second reference flap angle θ2 (θb=θ2), and then, the control proceeds to step ST110. This second reference flap angle θ2 is larger than the first reference flap angle θ1 by a predetermined angle (θ2>θ1).

In step ST107, if it is determined that the net weight Wr exceeds the second weight reference value Wu (Wu<Wr), the control proceeds to step ST108. In step ST108, the target rotation speed setting value Nes is set to the third reference rotation speed N3 (Nes=N3). This third reference rotation speed N3 is higher than the second reference rotation speed N2 in the above step ST24 by a predetermined speed (N3>N2). Then, in step ST109, the target flap angle indication value θb of the flaps 52 is set to the predetermined reference flap angle θ3 (θb=θ3), and then, the control proceeds to step ST110. This reference flap angle θ3 is larger than the second reference flap angle θ2 by a predetermined angle (θ3>θ2).

In step ST110, after the process of correcting the rotation speed of the engine 15 and the flap angle of the flaps 52 is performed, the control returns to step ST27 of FIG. 10. Specific control flow for performing the process of correcting the rotation speed of the engine 15 and the flap angle of the flaps 52 in step ST110 will be described with reference to FIG. 14.

Figure 12:
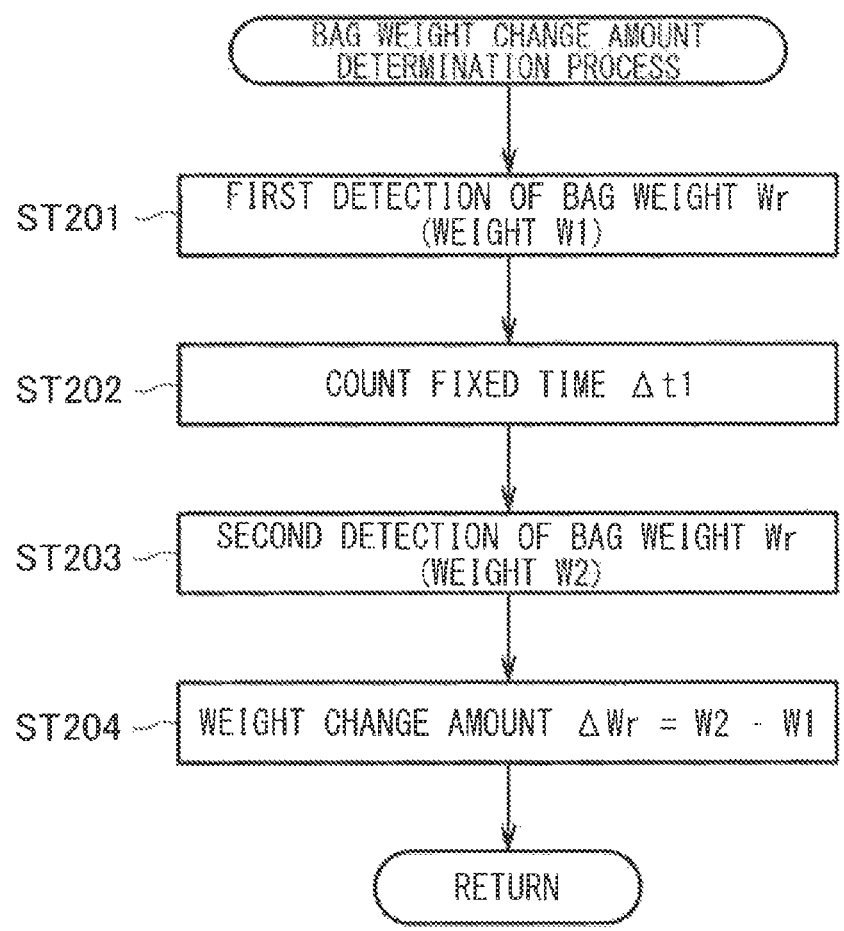
FIG. 12 shows an interruption routine of a bag weight change amount determination process used in step ST101 of the control flow chart shown in FIG. 11.

FIG. 12 is a control flow diagram of the interruption routine of the bag weight change amount determination process, for determining the change amount ΔWr of the weight Wr of the grass clippings container 22.

After this interruption routine is started, firstly, in step ST201, the net weight Wr of the grass clippings container 22 is detected by the grass clippings container weight detection unit 113 (first detection). The net weight Wr at this time will be referred to as the "first weight W1". In the next step ST202, predetermined fixed time Δt1 is counted. In the next step ST203, the net weight Wr of the grass clippings container 22 is detected by the grass clippings container weight detection unit 113 (second detection). The net weight Wr at this time will be referred to as the "second weight W2".

In the next step ST204, the difference ΔWr between the first weight W1 and the second weight W2, i.e., the change amount ΔWr per predetermined fixed time Δt1, of the weight Wr is determined (ΔWr=W2−W1). Thereafter, this interruption routine is finished.

Figure 13:
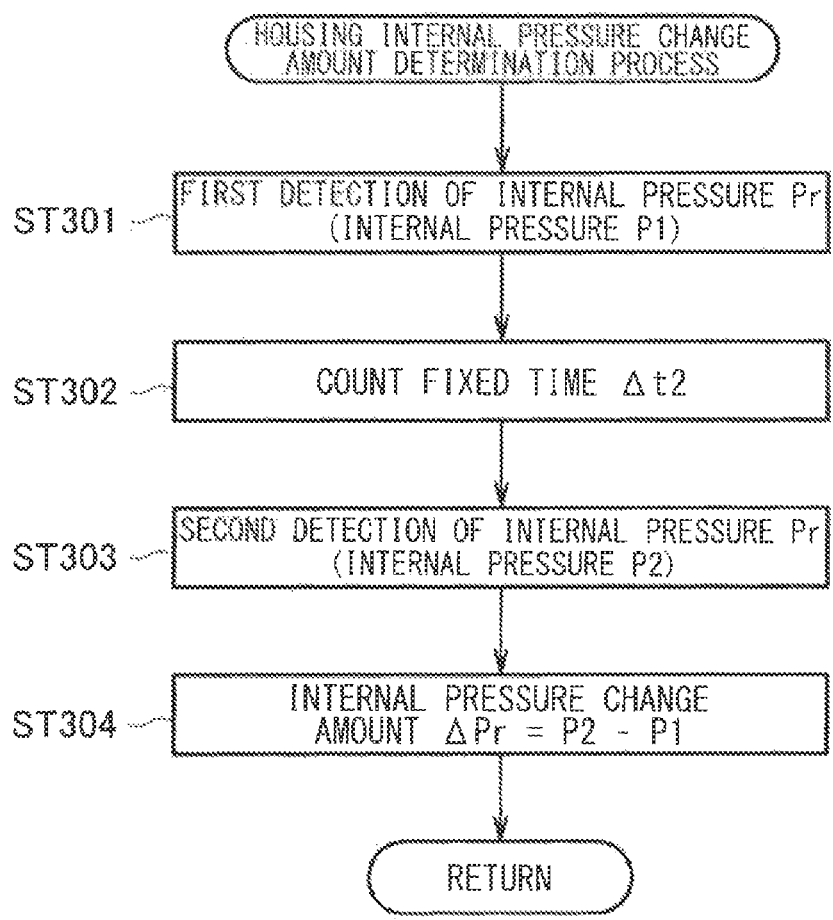
FIG. 13 shows an interruption routine of a housing internal pressure change amount determination process used in step ST102 of the control flow chart shown in FIG. 11.

FIG. 13 shows a control flow diagram of the interruption routine of the housing internal pressure change amount determination process, for determining the change amount ΔPr of the internal pressure Pr of the housing 11.

After this interruption routine is started, firstly, in step ST301, the net internal pressure Pr of the housing 11 is detected by the internal pressure detection unit 111 (first detection). The net internal pressure Pr at this time will be referred to as the "first internal pressure P1". In the next step ST302, predetermined fixed time Δt2 is counted. In the next step ST303, the net internal pressure Pr of the housing 11 is detected by the internal pressure detection unit 111 (second detection). The net internal pressure Pr at this time will be referred to as the "second internal pressure P2".

In the next step ST304, the difference ΔPr between the first internal pressure P1 and the second internal pressure P2, i.e., the change amount ΔPr per predetermined fixed time Δt2 of the internal pressure Pr is determined (ΔPr=P2−P1). Thereafter, this interruption routine is finished.

Figure 14:
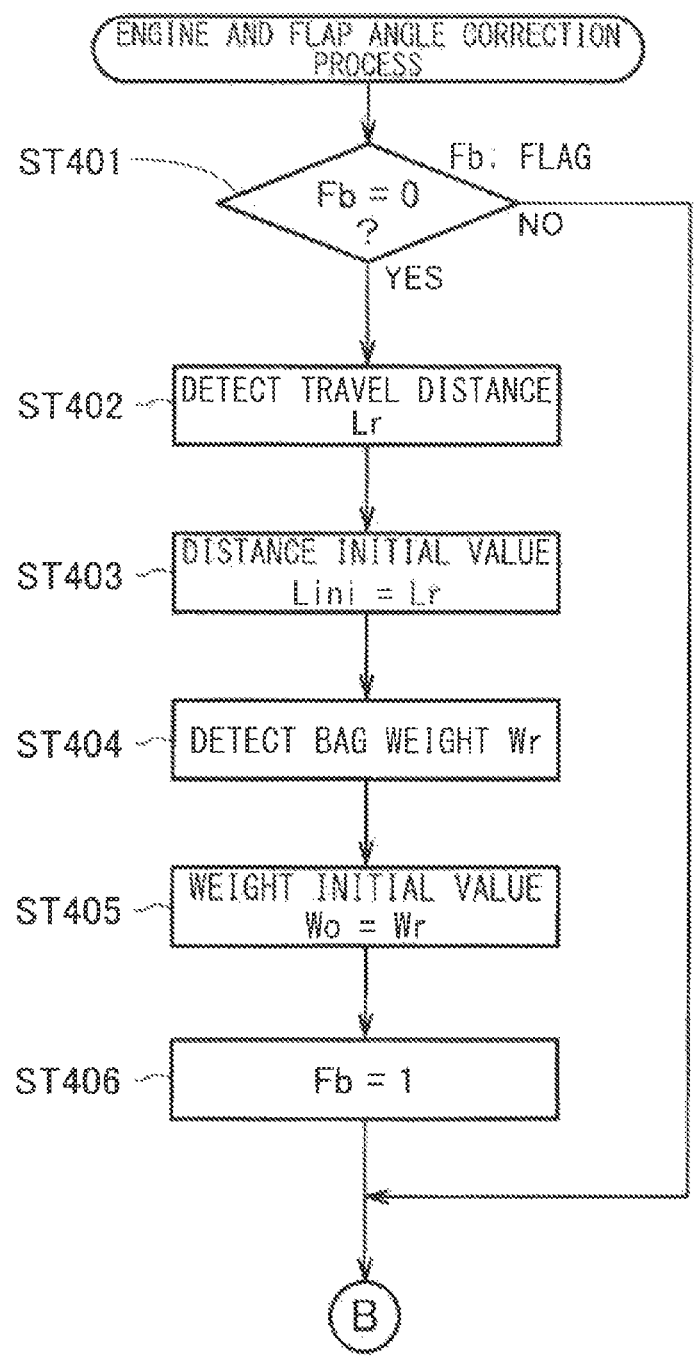
FIG. 14 shows the former part of a sub-routine of step ST111 of the control flow chart shown in FIG. 11.
Figure 15:
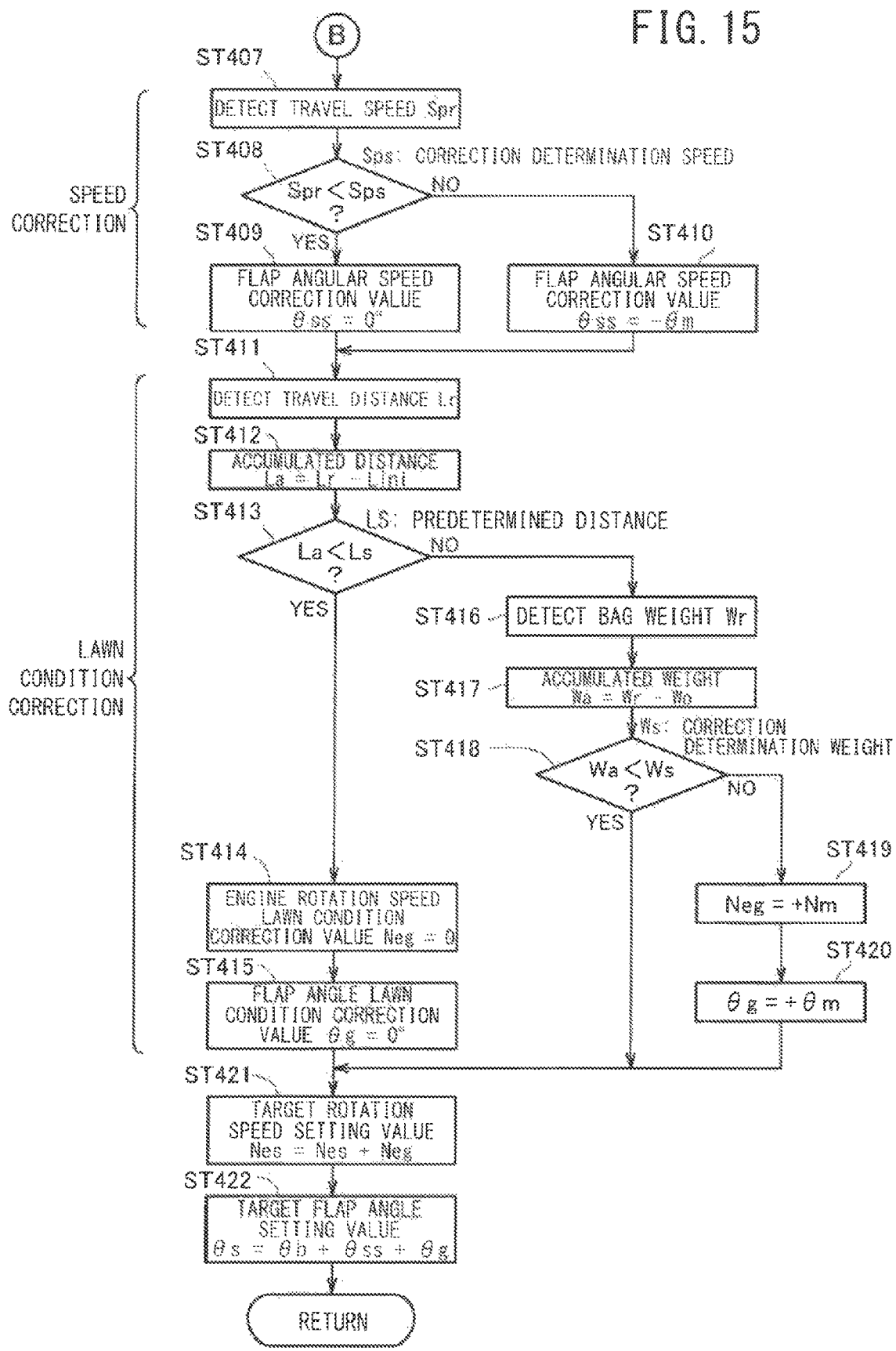
FIG. 15 shows the latter part of a sub-routine of step ST111 of the control flow chart shown in FIG. 11.

FIGS. 14 and 15 show a subroutine for performing the process of correcting the rotation speed of the engine 15 and the flap angle of the flaps 52 shown in the above step ST110 of FIG. 11.

Firstly, in step ST401, it is determined whether or not the initial value flag Fb is "0" (Fb=0). At this time, if it is determined that Fb=0, the current travel distance Lr of the lawn mower 10 is determined (step ST402). The current travel distance Lr is a value in the case where it is determined that the blade switch 104 is off in step ST16 of FIG. 10. The current travel distance Pr may have any value. For example, the current travel distance Pr may be 0.

For example, in the case where the current travel speed Spr of the lawn mower 10 is constant, the control unit 117 can determine the current travel distance Lr by multiplying the net travel speed Spr detected by the travel speed detection unit 112 by the travel time (accumulated time) of the lawn mower 10. That is, the control unit 117 has a function of the travel distance detection unit. Further, the current travel distance Lr can be directly detected by the travel distance detection unit of the lawn mower 10. In the present invention, a "travel distance detection unit 131" can determine the travel distance Lr directly and/or indirectly. That is, the lawn mower 10 has the travel distance detection unit 131 (see FIG. 8) for detecting the travel distance Lr of the lawn mower 10.

In the next step ST403, the value of the current travel distance Lr is set to an initial value Lini of the travel distance (Lini=Lr). In the next step ST404, the current actual weight Wr (net weight Wr) of the grass clippings container 22 is detected by the grass clippings container weight detection unit 113. In the next step ST405, the value of the current net weight Wr is set to the initial value Wo of the net weight (Wo=Wr). In the next step ST406, the initial value flag Fb is set to "1" (Fb=1), and then, the control proceeds to the next step ST407.

In the meanwhile, in step ST401, if it is determined that the initial flag Fb is not "0" (Fb≠0), the control proceeds to step ST407 directly.

In the next step ST407, the net travel speed Spr is detected by the travel speed detection unit 112. In the next step ST408, it is determined whether or not the net travel speed Spr is less than predetermined correction determination speed Sps (Spr<Sps). In this regard, if it is determined that the net travel speed Spr is less than the correction determination speed Sps (Spr<Sps), the control proceeds to the next step ST409. In step ST409, the value of the flap angular speed correction value θss is set to 0°, and then, the control proceeds to step ST411. That is, the flap angle θr is not corrected.

In the meanwhile, in step ST408, if it is determined that the net travel speed Spr reaches the correction determination speed Sps (Spr≥Sps), the control proceeds to the next step ST410. In step ST410, the value of the flap angular speed correction value θss is set to "−θm" (θss=−θm), and then, the control proceeds to step ST411. θm is a predetermined correction value.

Then, in step ST411, the current travel distance Lr of the lawn mower 10 is determined by the travel distance detection unit 131 again. It should be noted that, the above steps ST402 to ST411 are performed under a condition where the rotation speed Ner of the engine 15 and the flap angle θr of the flaps 52 are kept substantially constant.

In the next step ST412, the accumulated distance La is calculated by subtracting the initial value Lini of the travel distance determined in the above step ST403 from the current travel distance Lr determined in step ST411 (La=Lr−Lini). This current accumulated distance La is a value of the accumulated distance from the time when the blade switch 104 was turned on to the current time.

In the next step ST413, it is determined whether or not the accumulated distance La from the time when the blade switch 104 was turned on to the current time is less than the predetermined distance Ls (La<Ls). If it is determined that the accumulated distance La to the current time is less than the predetermined distance Ls (La<Ls), the control proceeds to step ST414.

In step ST414, the rotation speed lawn condition correction value Neg of the engine 15 is set to "0" (Neg=0). That is, no correction is made. In the next step ST415, after the flap angel lawn condition correction value θg of the flaps 52 is set to "0" (θg=0), the control proceeds to the next step ST421. That is, no correction is made.

In the meanwhile, in step ST413, if it is determined that the accumulated distance La up to the current time reaches the predetermined distance Ls (La≥Ls), the control proceeds to step ST416. In step ST416, the current actual weight Wr (net weight Wr) of the grass clippings container 22 is detected by the grass clippings container weight detection unit 113 again.

In the next step ST417, the change amount Wa of the net weight Wr of the grass clippings container 22, i.e., the accumulated weight Wa is calculated by subtracting the initial value Wo of the net weight from the current net weight Wr of the grass clippings container 22 (Wa=Wr−Wo). In this step ST417, the amount of increase in the net weight Wr of the grass clippings container 22, i.e., the accumulated weight Wa during travel of the lawn mower 10 by the predetermined distance Ls can be determined. It should be noted that, under a condition where the rotation speed Ner of the engine 15 and the flap angle θr of the flaps 52 are kept substantially constant, the accumulated weight Wa is a value obtained during a period in which the lawn mower 10 travels by the predetermined distance Ls.

In the next step ST418, it is determined whether or not the accumulated weight Wa of the grass clippings container 22 is lighter than the predetermined correction determination weight Ws (Wa<Ws). At this time, if it is determined that the accumulated weight Wa is below the correction determination weight Ws (Wa<Ws), the control proceeds to step ST421 directly.

In the above step ST418, if it is determined that the accumulated weight Wa is increased to the correction determination weight Ws (Wa≥Ws), the control proceeds to step ST419. In step ST419, the rotation speed lawn condition correction value Neg of the engine 15 is set to "+Nm" (Neg=+Nm). That is, a correction is made. Nm is a correction value. In the next step ST420, the flap angle lawn condition correction value θg of the flaps 52 is set to "+θm" (θg=+θm), and then, the control proceeds to step ST421. θm is a correction value.

In the next step ST421, the value of the target rotation speed setting value Nes is corrected using the rotation speed lawn condition correction value Neg. Specifically, a value obtained by adding the rotation speed lawn condition correction value Neg to the target rotation speed setting value Nes is used as a new target rotation speed setting value Nes (Nes=Nes+Neg).

In the next step ST422, the new target flap angle setting value θs of the flaps 52 is set, and then, the control returns to step ST110 of FIG. 11. Specifically, the target flap angle setting value θs is determined by adding the flap angular speed correction value θss and the flap angle lawn condition correction value θg to the target flap angle indication value θb of the flaps 52 (θs=θb+θss+θg). The target flap angle indication value θb is a setting value which is set based on the change amount ΔWr per fixed time Δt1 of the weight Wr and the change amount ΔPr per fixed time Δt2 of the internal pressure Pr (steps ST103, ST108, and ST110).

Figure 16:
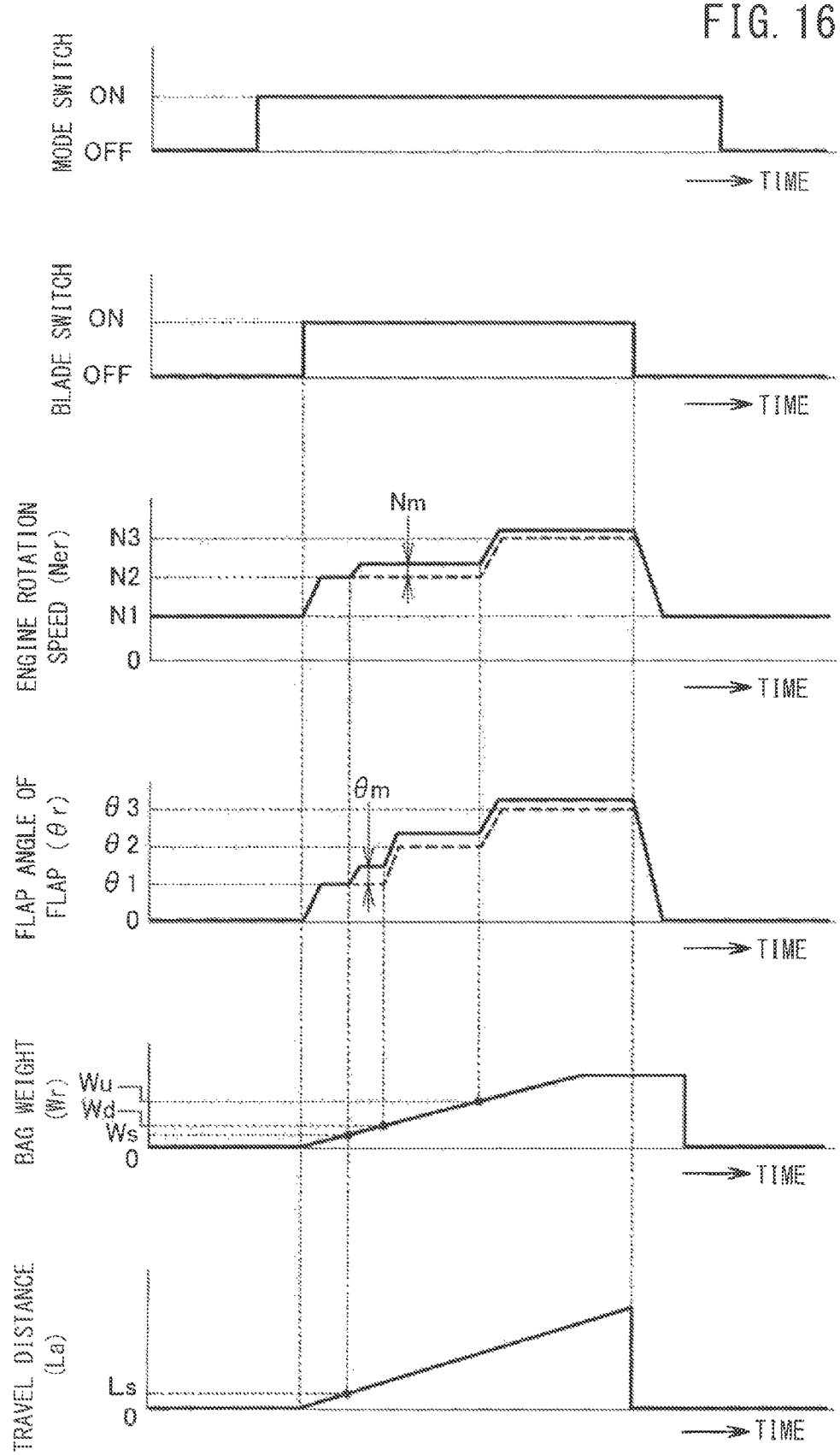
FIG. 16 is a graph showing operation of a lawn mower according to the control unit shown in FIG. 8.

Next, operation of each component at the time of performing the control flow shown in FIGS. 9 to 15 will be described with reference to FIG. 16. FIG. 16 is a time chart of the lawn mower 10, showing operation of each component. In the time chart, the horizontal axis denotes time.

Now, it is assumed that the mode switch 11 is off (i.e., mulching mode), the blade switch 104 is off, the engine 15 is in the middle of rotation at the first reference rotation speed N1, and the net flap angle θr of the flaps 52 is zero. The grass clippings container 22 is empty.

Thereafter, when the mode switch 11 is turned on, i.e. after switching to the bagging mode, the blade switch 104 is turned on. At this time, the rotation speed Ner of the engine 15 becomes the second reference rotation speed N2, and the net flap angle θr of the flaps 52 becomes the first reference flap angle θ1.

During travel of the lawn mower 10 by the predetermined distance Ls after the blade switch 104 was turned on, in the case where the net weight Wr of the grass clippings container 22 is increased to the correction determination weight Ws, the rotation speed Ner of the engine 15 is increased by the correction value Nm, and the flap angle θr of the flaps 52 is increased by the correction value θm.

The rotation speed Ner of the engine 15 and the flap angle θr of the flaps 52 are corrected based on the change amount Wa of the net weight Wr of the grass clippings container 22 from the time when the blade switch 104 was turned on to the time when the lawn mower 10 traveled by the predetermined distance Ls, i.e., based on the accumulated weight Wa. This correction continues until the blade switch 104 is turned off.

Thereafter, when the blade switch 104 is turned off, the value of the travel distance La (accumulated distance La) of the lawn mower 10 is reset.

The above explanation is summarized as follows:

As shown in FIGS. 14 and 15, the control unit 117 implements control to keep the rotation speed Ner of the engine 15 and the flap angle θr of the flaps 52 substantially constant, over an elapsed time period from the time of starting detection of the travel distance Lr by the travel distance detection unit 131 until the end of the travel by the predetermined distance Ls. Further, the control unit 117 determines the change amount Wa of the weight Wr of the grass clippings container 22, detected by the grass clippings container weight detection unit 113 until elapse of the time period. Then, the control unit 117 implements control according to the change amount Wa of the weight Wr to adjust the rotation speed Ner of the engine 15 and the flap angle θr of the flaps 52.

In the case where the change amount Wa of the weight Wr is large, it can be presumed that the lawn grass cut by the cutter blade 14 (grass clippings) has a lawn condition of heavy weight. In the case where the change amount Wa of the weight Wr is small, it can be presumed that the grass clippings have a lawn condition of light weight. In this manner, depending on the characteristics (lawn condition) of the lawn grass cut by the cutter blade 14, the rotation speed Ner of the engine 15 and the flap angle θr of the flaps 52 can be adjusted.

Thus, regardless of the lawn condition, by orienting the lawn grass growing on the lawn ground to stand upright by the upward air flow, it is possible to cut (clip) the lawn grass by the cutter blade 14 efficiently. Further, after the lawn grass (grass clippings) cut by the cutter blade 14 is lifted upward, and swirled in the housing 11 by the upward air flow and the swirl air flow generated by the flaps 52, the lawn grass can be transported into the grass clippings container 22 efficiently. Therefore, the operator can perform the lawn mowing operation stably and highly efficiently regardless of the lawn condition. It is possible to eliminate unevenness in lawn grass after the lawn mowing operation due to the difference in the lawn condition, without requiring the operator to perform some operation consciously. Consequently, it is possible to improve the work efficiency of the lawn mowing operation.

Further, by adjusting the rotation speed Ner of the engine 15 and the flap angle θr of the flaps 52 depending on the characteristics (lawn condition) of the grass clippings cut by the cutter blade 14, the wind amount of the transportation wind generated by the cutter blade 14 and the flaps 52 is changed. Therefore, the grass clippings can be stored in the grass clippings container 22 as uniformly as possible. Accordingly, it is possible to greatly improve the storage ratio of the grass clippings container 22. A larger quantity of grass clippings can be stored in the grass clippings container 22 efficiently.

Further, as shown in FIGS. 11 to 13, the control unit 117 determines the change amount ΔWr per predetermined fixed time Δt1 of the weight Wr detected by the grass clippings container weight detection unit 113, and the change amount ΔPr per predetermined fixed time Δt2 of the internal pressure Pr detected by the internal pressure detection unit 111. Then, in the case where the control unit 117 determines that two conditions, i.e., the first condition where the change amount ΔWr of the weight Wr is below the predetermined weight change amount reference value ΔWs and the second condition where the change amount ΔPr of the internal pressure Pr has increased to the predetermined internal pressure change amount reference value ΔPs, are satisfied, the control unit 117 controls the actuator 60 in a manner that the flaps 52 are placed in a substantially horizontal state.

In the case where the change amount ΔWr of the weight Wr of the grass clippings container 22 is small, and the change amount ΔPr of the internal pressure Pr of the housing 11 is large, the following two presumptions can be made.

The first presumption is made in the case where the change amount ΔWr of the weight Wr of the grass clippings container 22 is "small". In this case, the grass clippings container 22 stores a substantial amount of grass clippings to almost reach the storage capacity limit. If the change amount ΔPr of the internal pressure Pr of the housing 11 is "large", the transportation window does not flow from the housing 11 toward the grass clippings container 22 smoothly. Therefore, in the case where the change amount ΔWr of the weight Wr of the grass clippings container 22 is small and the change amount ΔPr of the internal pressure Pr of the housing 11 is large, it can be presumed that the grass clippings container 22 has almost reached its storage capacity limit, and for this reason, the transportation wind does not flow from the housing 11 to the grass clippings container 22 smoothly.

The second presumption is made in the case where the change amount ΔWr of the weight Wr of the grass clippings container 22 is small and the change amount ΔPr of the internal pressure Pr of the housing 11 is large. In this case, it is presumed that jamming of the grass clippings has occurred in the grass clippings discharge passage 21 between the housing 11 and the grass clippings container 22.

The control unit 117 can accurately determine that the grass clippings container 22 has almost reached its storage capacity limit, or jamming of the grass clippings has occurred in the grass clippings discharge passage 21 between the housing 11 and the grass clippings container 22, based on the change amount ΔWr of the weight Wr of the grass clippings container 22 and the change amount ΔPr of the internal pressure Pr of the housing 11.

When the grass clippings container 22 has almost reached its storage capacity limit, or when jamming of the grass clippings has occurred in the grass clippings discharge passage 21 between the housing 11 and the grass clippings container 22, the control unit 117 place the flaps 52 in a substantial horizontal state. As a result, the quantity of the wind of the upward air flow and the swirl air flow generated by the flaps 52, the swirl flow of the air, and the transportation wind is decreased. Therefore, the grass clippings do not flow from the housing 11 to the grass clippings container 22 very much. Consequently, jamming of the grass clippings does not occur easily between the housing 11 and the cutter blade 14. That is, before jamming of the grass clippings occurs between the housing 11 and the cutter blade 14, the flaps 52 can be placed in the substantially horizontal state. It is possible to prevent phenomenon where the rotating cutter blade 14 collides with the grass clippings. Therefore, it is possible to improve the durability of the entire lawn mower 10 and the drive source 15.

Further, as shown in FIG. 11, if the control unit 117 determines that the two conditions (the first condition and the second condition) are satisfied, the control unit 117 implements control to drive the alarm 119.

In this manner, it is possible to notify the operator by the alarm 119 that the grass clippings container 22 has almost reached its storage capacity limit, or jamming of the grass clippings has occurred in the grass clippings discharge passage 21 between the hosing 11 and the grass clippings container 22. The operator can learn the storage capacity limit of the grass clippings container 22 and the jamming state of the grass clippings promptly.

Further, as shown in FIG. 11, the control unit 117 implements control of at least one of the rotation speed Ner of the engine 15 and the flap angle θr of the flaps 52 in accordance with the weight Wr detected by the grass clippings container weight detection unit 113.

When the grass clippings container 22 is light, the grass clippings container 22 has the extra storage capacity to store the grass clippings much more. In this case, the control unit 117 reduces the rotation speed Ner of the drive source 15 or reduces the flap angle θr of the flaps 52 toward the horizontal side, or implements both of these controls. Consequently, the wind amount of the transportation wind generated by the cutter blade 14 and the flaps 52 becomes small. The grass clippings cut by the cutter blade 14 can be transported from the housing 11 to the grass clippings container 22, and it is possible to store the grass clippings at a position near the inlet of this grass clippings container 22.

When the grass clippings container 22 is heavy, the grass clippings container 22 does not have the extra storage capacity to store the grass clippings much more. In this case, the control unit 117 changes the rotation speed Ner of the drive source 15, or increases the flap angle θr of the flaps 52, or implement both of these controls. Consequently, the wind amount of the transportation wind generated by the cutter blade 14 and the flaps 52 becomes large. It is possible to transport the grass clippings from the housing 11 to the grass clippings container 22, and store the grass clippings at a deeper position in the grass clippings container 22.

As descried above, by controlling at least one of the rotation speed Ner of the drive source 15 and the flap angle θr of the flaps 52 in correspondence with the weight Wr detected by the grass clippings container weight detection unit 113, it is possible to store the grass clippings in the grass clippings container 22 as uniformly as possible. Therefore, it is possible to greatly improve the storage ratio of the grass clippings container 22. It is possible to efficiently store the larger quantity of grass clippings in the grass clippings container 22. The frequency of replacing the grass clippings container 22 can be reduced, and improvement in the efficiency of the lawn mowing operation is achieved. Further, it is not required for the operator to perform some operation consciously to increase the storage ratio of the grass clippings container 22.

Further, as shown in FIG. 9, the control unit 117 implements control of the bagging mode and the control of the mulching mode in accordance with the switch signals received from the mode switch detection unit 114. Therefore, the operation of the lawn mower 10 can be performed in an operation mode arbitrarily selected between the bagging mode and the mulching mode.

Further, as shown in FIGS. 9, 11, and 15, when the control unit 117 receives a signal of the bagging mode from the mode switch detection unit 114 (including the operation switch), the control unit 117 implements control in a manner that the rotation speed Ner of the drive source 15 is changed to the predetermined reference rotation speed Nes (target rotation speed setting value Nes) and the flap angle θr of the flaps 52 is changed to the predetermined reference flap angle θs (target flap angle setting value θs).

Therefore, for example, by selecting the bagging mode beforehand, prior to starting the lawn mowing operation, at least one of the rotation speed Ner of the drive source 15 and the flap angle θr of the flaps 52 can be placed in a suitable state before starting operation. Accordingly, further improvement in the work efficiency of the operation is achieved.

The lawn mower 10 of the present invention is suitably adopted as a walk-behind lawn mower.

While the invention has been particularly shown and described with reference to a preferred embodiment, it will be understood that variations and modifications can be effected thereto by those skilled in the art without departing from the scope of the invention as defined by the appended claims.

What is claimed is:
1. A lawn mower comprising:
a cutter blade rotatable about a rotation shaft extending in a vertical direction;
a drive source configured to drive the cutter blade through the rotation shaft; and
a grass clippings container configured to store lawn grass cut by the cutter blade and transported by transportation wind generated by the cutter blade,
a flap provided for the cutter blade, the flap having a flap angle changeable along a horizontal line which is perpendicular to the rotation shaft;
an actuator configured to control the flap angle of the flap;
a control unit configured to control the actuator;
a grass clippings container weight detection unit configured to detect weight of the grass clippings container; and
a travel distance detection unit configured to detect travel distance of the lawn mower,
wherein the control unit is configured to:
implement control in a manner that rotation speed of the drive source and the flap angle of the flap are kept substantially constant over an elapsed time period from time when detection of the travel distance is started by the travel distance detection unit to time when travel of predetermined distance is completed;
determine a change amount of the weight of the grass clippings container detected by the grass clippings container weight detection unit over the elapsed time period; and
implement control in a manner that the rotation speed of the drive source and the flap angle of the flap are adjusted in accordance with the change amount of the weight.

* * * * *